United States Patent
Martin et al.

(10) Patent No.: US 11,531,628 B2
(45) Date of Patent: Dec. 20, 2022

(54) PROTECTING CACHE ACCESSES IN MULTI-TENANT PROCESSING ENVIRONMENTS

(71) Applicant: International Business Machines Corporation, Armonk, NY (US)

(72) Inventors: Brian Keith Martin, Cary, NC (US); Mukul Tuteja, San Ramon, CA (US); Flannan Lok-Hang Lo, Markham (CA); Anthony Erwin, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 16/786,249

(22) Filed: Feb. 10, 2020

(65) Prior Publication Data

US 2021/0248090 A1 Aug. 12, 2021

(51) Int. Cl.
*H04L 29/06* (2006.01)
*G06F 12/14* (2006.01)
*G06F 21/44* (2013.01)

(52) U.S. Cl.
CPC ...... *G06F 12/1466* (2013.01); *G06F 12/1408* (2013.01); *G06F 21/44* (2013.01); *G06F 2212/1052* (2013.01)

(58) Field of Classification Search
CPC ... G06F 12/1466; G06F 12/1408; G06F 21/44
See application file for complete search history.

(56) References Cited

U.S. PATENT DOCUMENTS

| 9,419,958 | B2 | 8/2016 | Srivastava | |
|---|---|---|---|---|
| 9,825,925 | B2 | 11/2017 | Hore | |
| 2016/0149882 | A1* | 5/2016 | Srivastava | H04L 63/102 726/4 |
| 2018/0034792 | A1* | 2/2018 | Gupta | G06F 21/602 |
| 2019/0097791 | A1 | 3/2019 | Hersans | |

OTHER PUBLICATIONS

"Fortinet Solutions for the MSSP," Fortinet, Inc., accessed Sep. 5, 2019, pp. 1-34. <https://cipherwire.net/wp-content/uploads/2012/06/Fortinet_Solutions_for_the_MSSPs_MP_201106.pdf>.

(Continued)

*Primary Examiner* — Jason K Gee
(74) *Attorney, Agent, or Firm* — Richard B. Thomas

(57) ABSTRACT

Embodiments relate to a system, program product, and method for protecting cache access in a multi-tenant environment, and, more specifically, for allowing access to specified data, encrypted or unencrypted, in a shared cache to authorized tenants, while denying access to the data for unauthorized tenants. The system includes a server including one or more shared cache and a plurality of tenant devices coupled to the server. The server is configured to run one or more applications thereon, where each tenant has access to one or more authorized instances of the applications. The system also includes a cache proxy coupled to the tenant devices and the shared cache. The cache proxy facilitates enforcing one or more schemes to provide for separation of data for authorized tenants and their users using the shared cache from unauthorized tenants and users.

3 Claims, 18 Drawing Sheets

(56) References Cited

OTHER PUBLICATIONS

"Working with cache keys," Apigee Docs, accessed Sep. 5, 2019, 3 pages. <https://docs.apigee.com/api-platform/reference/policies/working-cachekeys>.

Anonymous, "A Mechanism & Apparatus for enables Multi-tenant for JAAS( Java Authentication & Authorization Service)," IP.com, Disclosure No. IPCOM000206857D, May 10, 2011, 6 pages. <https://priorart.ip.com/IPCOM/000206857>.

Anonymous, "Method and system for dynamic management of cache eviction in multitenant environments," IP.com, Disclosure No. IPCOM000239143D, Oct. 16, 2014, 3 pages. <https://priorart.ip.com/IPCOM/000239143>.

Anonymous, "Using an encrypted tenant context to protect access to data thru methods in a program for multi-tenant SaaS application with shared database," IP.com, Disclosure No. IPCOM000255024D, Aug. 27, 2018, 4 pages. <https://priorart.ip.com/IPCOM/000255024>.

Gracia-Tinedo et al., "Crystal: Software-Defined Storage for Multi-tenant Object Stores," 15th USENIX Conference on File and Storage Technologies, Feb. 27-Mar. 2, 2017, ISBN 978-1-931971-36-2, pp. 243-256. <https://www.usenix.org/conference/fast17/technical-sessions/presentation/gracia-tinedo>.

"Grace Period Disclosure Statement of Applicant," dated Feb. 10, 2020, 1 page.

Mell et al., "The NIST Definition of Cloud Computing," Recommendations of the National Institute of Standards and Technology, U.S. Department of Commerce, Special Publication 800-145, Sep. 2011, 7 pages.

\* cited by examiner

PROTECTING CACHE ACCESSES IN MULTI-TENANT PROCESSING ENVIRONMENTS

STATEMENT REGARDING PRIOR DISCLOSURES BY THE INVENTOR OR A JOINT INVENTOR

Pursuant to 37 C.F.R. § 1.130, 35 U.S.C. §§ 102(a)(1) and 102(b)(1)(A), and MPEP §§ 2153.01(a), 2155.01, 2155.02, 2155.04, 2155.05, and 2155.06, Applicant submits for consideration in the present application that the application is being filed within a one year grace period initiated by an authorized public disclosure by the joint inventors of the application. The nature of the public disclosure is the inclusion of features described in the present patent application in a commercially-available product through a release of a product update. The date of the authorized public disclosure is conservatively disclosed as the earliest possible date the features described herein were available to the public, i.e., Mar. 4, 2019.

BACKGROUND

The present disclosure relates to protecting cache access in a multi-tenant environment, and, more specifically, for allowing access to specified data in a shared cache to authorized tenants and tenant users, while denying access to the data for unauthorized tenants and tenant users.

Many known traditional, multi-tenant Software as a Service (SaaS) environments use shared caches to speed up access to data and to reduce a loading on backend datastores. In many of such multi-tenant environments, separation of client data is maintained between authorized tenants and unauthorized tenants to reduce a potential for accidental exposure of one client's data to another client.

SUMMARY

A system, computer program product, and method are provided for protecting cache access in a multi-tenant environment through allowing access to specified data in a shared cache to authorized tenants and tenant users, while denying access to the data for unauthorized tenants and tenant users.

In one aspect, a computer system is provided for protecting cache access in a multi-tenant environment. The system includes a server including one or more shared cache. The server is configured to run one or more applications thereon. The computer system also includes a plurality of tenant devices communicatively coupled to the server. The plurality of tenant devices includes at least a first tenant device and a second tenant device. The computer system further includes processing device configured to implement a cache proxy. The cache proxy is coupled to at least the first tenant device and the second tenant device and the one or more shared cache. The first tenant device and the second tenant device have access to the shared cache through the cache proxy. The cache proxy is configured to receive, from a first instance of the one or more applications on behalf of the first tenant device, a request for retrieval of data stored on the shared cache. The request includes a cache key that includes credentials specific to the first tenant device to permit retrieval of the data from the one or more shared cache. The cache proxy is also configured to determine the credentials are valid through validation of a pattern of the cache key. The cache proxy is further configured to retrieve the data, thereby creating retrieved data, and provide the retrieved data to the first tenant device.

In another aspect, a computer program product is provided for protecting cache access in a multi-tenant environment. The computer program product includes one or more computer readable storage media and program instructions collectively stored on the one or more computer-readable storage media. The program instructions include program instructions to provide, to a cache proxy, from a first instance of an application on behalf of a first tenant device, a request for retrieval of data stored on a shared cache. The request includes a cache key, where the first tenant device and a second tenant device have access to the shared cache through the cache proxy. The program instructions also include program instructions to receive, at the cache proxy, the cache key. The cache key includes credentials specific to the first tenant to permit retrieval of the data in the shared cache. The program instructions further include program instructions to determine, by the cache proxy, the credentials are valid, including program instructions to validate, by the cache proxy, a pattern of the cache key. The program instructions also include program instructions to retrieve, by the cache proxy, the data, thereby creating retrieved data. The program instructions further include program instructions to provide, by the cache proxy the retrieved data to the first tenant device.

In yet another aspect, a computer-implemented method for protecting cache access in a multi-tenant environment. The method includes receiving, by a cache proxy, from a first instance of an application on behalf of a first tenant device, a request for retrieval of data stored on a shared cache. The request includes a cache key, where the first tenant device and a second tenant device have access to the shared cache through the cache proxy. The cache key includes credentials specific to the first tenant device to permit retrieving the data in the shared cache. The method further includes determining, by the cache proxy, the credentials are valid through validating a pattern of the cache key. The method also includes retrieving, by the cache proxy, the data, thereby creating retrieved data, and providing to the first tenant device, by the cache proxy, the retrieved data.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
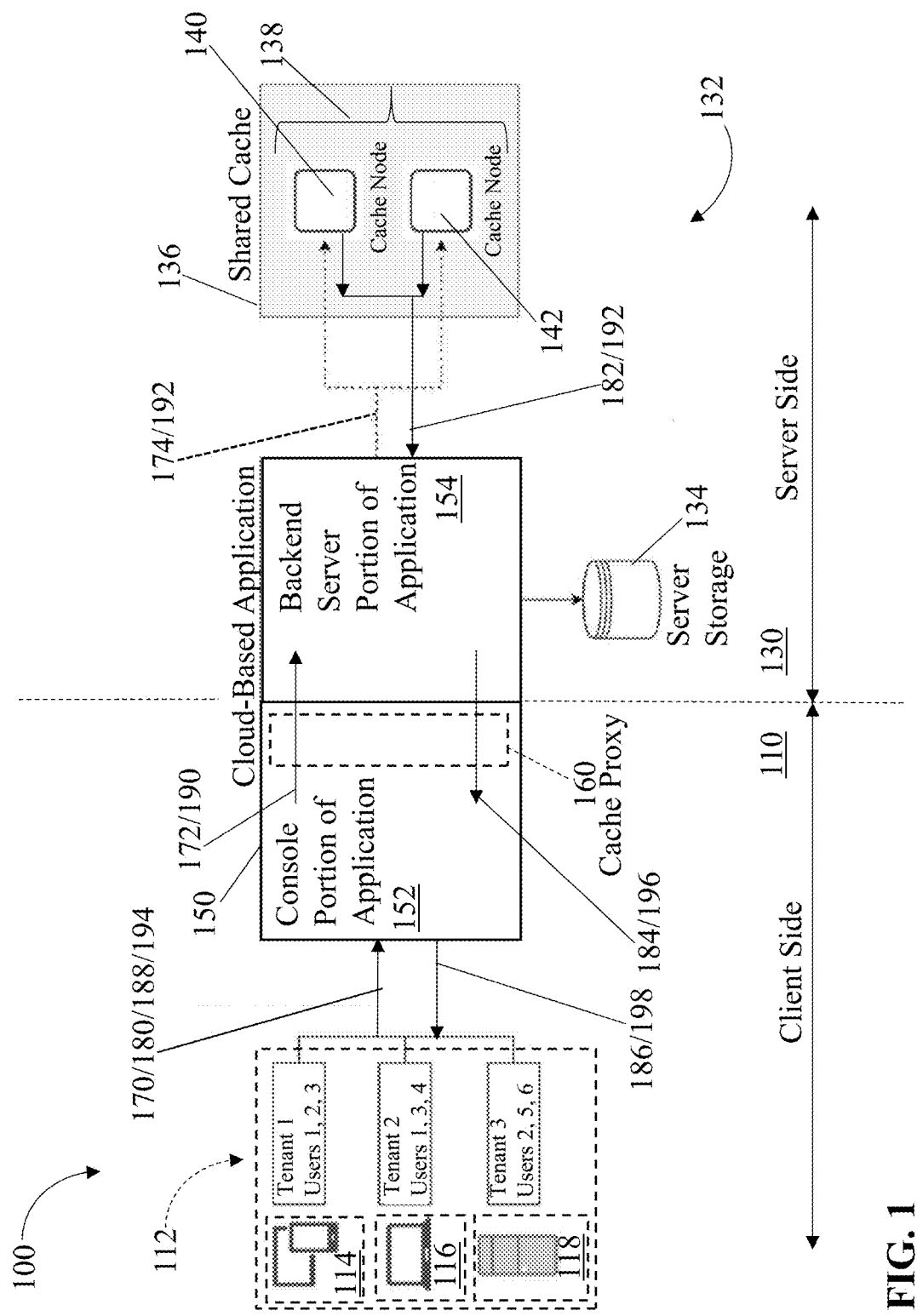
FIG. 1 is a schematic diagram illustrating a multi-tenant computing environment suitable for allowing access to specified data in a shared cache to authorized tenants, while denying access to the data for unauthorized tenants, through a cache proxy, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Many known traditional, multi-tenant Software as a Service (SaaS) environments use shared caches to speed up access to data and to reduce a loading on backend datastores. Multi-tenant SaaS architectures typically employ multiple instances of a software application to serve multiple customers. Each customer is referred to as a tenant. Tenants may be given the ability to customize some parts of the application, such as color of as associated user interface or business/operational rules, but the tenants typically cannot customize the application's core code, which is maintained by the SaaS provider. Multi-tenancy can be economical because software development and maintenance costs incurred by the SaaS provider are shared between the tenants. In many such multi-tenant environments, separation of client data is maintained between tenants authorized to access the data and tenants not authorized to access the data to reduce a potential for accidental exposure of one client's data to another client. At least some of these multi-tenant environments rely exclusively on encryption of data with a myriad of combinations of encryption key schemes, however, not all data requires encryption and encryption increases the costs and complexity of tenant operations. In addition, for some tenants, additional protective measures beyond encryption for some sensitive data may be desired.

A system, computer program product, and method are disclosed and described herein for protecting cache access in a multi-tenant environment, and, more specifically, for allowing access to specified data, encrypted or unencrypted, in a shared cache to authorized tenants, while denying access to the data for unauthorized tenants. The system includes a server including one or more shared cache and a plurality of tenant devices coupled to the server, including, in at least some embodiments, for example, at least a first tenant device and a second tenant device. The server is configured to run one or more applications thereon, where each tenant has access to one or more authorized instances of the applications.

In at least some embodiments, each instance of each application has some level of tenant-specific customization. Also, in at least some embodiments, one or more users have access to the applications through more than one tenant, i.e., first and second tenant devices. The system also includes a cache proxy coupled to the first and second tenant devices and the shared cache, where the tenant devices have access to the shared cache through the cache proxy. In at least some embodiments, the cache proxy is resident within a client side portion of the application. In at least some alternative embodiments, the cache proxy is resident within the shared cache. Additionally, in at least some embodiments, the cache proxy is resident within a server side portion of the application. Accordingly, the tenants and their users have access to their associated data through the associated instances of the applications and a cache proxy.

The cache proxy facilitates enforcing one or more schemes to provide for separation of data for authorized tenants and their users using the shared cache from unauthorized tenants and users. One such scheme is a cache key space protection scheme. The cache key space protection scheme validates a tenant-specific cache key at least partially through evaluating a pattern of the cache key, including performing a verification of a tenant identifier embedded within the cache key.

The cache proxy includes a plurality of modules therein that enable the cache key space protection scheme. For example, a cache initializer module initializes the cache proxy through a bootstrap configuration module. The bootstrap configuration module defines which protection scheme will be used for a particular tenant and the particular data, including, in some cases, a plurality of at least partially concurrent and at least partially tandem protection schemes. The cache key space protection scheme defines a cache key pattern enforcement channel that includes a key pattern enforcement instructions module. The key pattern enforcement instructions module stores and transmits the instructions for enforcing the pattern to a registered key scheme handler module that enforces the key space protection scheme.

A data value is created and used through a console portion, i.e., a client side of an instance of a cloud-based application by, for example, the first tenant. The console portion is sometimes referred to as the "front end." Such data value is stored on the shared cache through a put process by the first tenant, i.e., the owner of the data through the cache key space protection scheme. The first tenant will generate a request to save the data value on the shared cache through the application, i.e., a put request. Upon receipt of the put request, and prior to placing the data value in the shared cache, a first tenant-specific cache key is generated by the console portion of the application. The first tenant-specific cache key includes unique credentials in the form of a predetermined specific pattern for the sequence of values therein, where the values include a first tenant-specific tenant identifier, i.e., a first tenant-specific identifier embedded within the cache key. The application combines the cache key and the data value in a transmission intended for the shared cache and delegates the put request to the cache proxy.

The put process for the data as executed through the cache key space protection scheme is performed by initializing the cache proxy through the bootstrap cache configuration previously created by the application. The bootstrap configuration is directed toward enforcement of at least the cache key space protection scheme to ensure that the cache keys follow only one or more designated patterns. Once the bootstrap configuration is initialized by the application, a registered key scheme handler module is triggered and attempts to validate the pattern of the cache key through execution of the key pattern enforcement instructions. If the credentials associated with the first tenant are validated, i.e., the pattern of the cache key and the first tenant-specific tenant identifier are validated, the data is stored in the shared cache. If the handler module cannot validate the pattern of the cache key to the tenant-specific pattern, or, the tenant identifier does not match the first tenant-specific tenant identifier, the credentials are not validated and the data value is not stored in the shared cache. Accordingly, the cache key space protection scheme facilitates tenants' data separation on the shared cache during data storage to the shared cache through enforcing a specific pattern of the tenant-specific cache key, including the correct tenant identifier.

The cache key space protection scheme also facilitates exclusion of unauthorized users and tenants from authorized tenants' data created and stored within the shared cache as described herein. The first tenant will be able to access and retrieve the first tenant's data, however the second tenant will not gain access to the first tenant's data. Similarly, the first tenant will not be able to access the data for the second tenant.

The first tenant will attempt to attain access to the first tenant's data on the shared cache through the console portion of the instance of the cloud-based application. Such data is stored on the shared cache through a get process by the first tenant, i.e., the owner of the data through the cache key space protection scheme. The first tenant will generate a request to access and retrieve the data on the shared cache through the application, i.e., a get request. The request includes the tenant-specific cache key, that in turn includes the credentials specific to the first tenant for data retrieval.

Upon receipt of the get request, and prior to retrieving the data value in the shared cache, the get process for the data value retrieval as executed through the cache key space protection scheme is performed by initializing, by the console portion of the application, the cache proxy through the bootstrap cache configuration previously created by the application. The bootstrap configuration is directed toward enforcement of at least the cache key space protection scheme to ensure that the cache keys follow only the one or more designated patterns. Once the bootstrap configuration is initialized by the application, the registered key scheme handler module is triggered and attempts to validate the pattern of the cache key through execution of the key pattern enforcement instructions. If the credentials associated with the first tenant are validated, i.e., the pattern of the cache key and the first tenant-specific tenant identifier are validated, the data value in the shared cache is accessed, retrieved, and provided to the first tenant device. If the registered key scheme handler module cannot validate the pattern of the cache key to the tenant-specific pattern, or, the tenant identifier does not match the first tenant-specific tenant identifier, the credentials are not validated and the data value is not accessed or retrieved. Accordingly, the cache key space protection scheme facilitates tenants' data separation on the shared cache during data retrieval from the shared cache through enforcing a specific pattern of the tenant-specific cache key, including the correct tenant identifier.

In addition to the cache key space protection scheme, at least some embodiments also include a value space protection scheme that may be used in conjunction with the cache key space protection scheme. The value space protection scheme defines a value protection enforcement channel that includes a plurality of modules for tenant value injection instructions, tenant value obfuscation instructions, and tenant value encryption instructions that transmit the associated instructions for enforcing the value space protection scheme to a registered value scheme handler module that enforces the value space protection scheme.

The data value is created as described above and upon receipt of the put request, and prior to placing the data value in the shared cache, the first tenant-specific cache key is generated that includes the unique credentials including the predetermined specific pattern for the sequence of values therein, where the values include the first tenant-specific tenant identifier. The application combines the cache key, the data value, and the tenant-specific identifier tagged to the data value in a transmission intended for the shared cache and delegates the put request to the cache proxy.

The put process for the data value as executed through the value key space protection scheme is performed by initializing, by the console portion of the application, the cache proxy through the bootstrap cache configuration previously created by the application. The bootstrap configuration is directed toward enforcement of both the cache key space protection scheme and the value space protection scheme. Once the bootstrap configuration is initialized by the application, the registered key scheme handler module operates as described herein to enforce the cache key space protection scheme. In addition, a registered value scheme handler module is triggered, and receives tenant value injection instructions from the tenant value injection instructions module to add the tenant identifier as an attribute to the data value field for the data value that is to be stored in the shared cache.

In addition to tenant value injection, the registered value scheme handler module receives tenant value encryption instructions from the tenant value encryption instructions module. The registered value scheme handler module generates a tenant-specific encryption key that is used to encrypt the data value that is to be stored in the shared cache and then the tenant-specific encryption key is stored in a tenant encryption key store module. The encrypted data is transmitted to the shared cache. Accordingly, the cache value space protection scheme facilitates tenants' data separation on the shared cache during data storage to the shared cache through a combination of: 1) tenant value injection features to add the tenant identifier as an attribute to the data value field for the data value that is to be stored in the shared cache; and 2) a tenant-specific encryption key that is used to encrypt the data value that is to be stored in the shared cache.

When the encrypted data value is requested by the first tenant through a get request, the cache key pattern protection scheme is executed as previously described. In addition, the value space protection scheme is executed. Upon receipt of the get request, and prior to retrieving the data value in the shared cache, the get process for the data value retrieval as executed through the value space protection scheme is performed by initializing, by the console portion of the application, the cache proxy through the bootstrap cache configuration previously created by the application. The bootstrap configuration is directed toward enforcement of both the cache key space protection scheme and the value space protection scheme to retrieve and decrypt the data value. Once the bootstrap configuration is initialized by the application, the registered value scheme handler module is triggered and the registered value scheme handler module retrieves the tenant-specific encryption key for this tenant from the tenant encryption key store module to decrypt the requested data value within the shared cache. If the retrieved key is not the same key that initially encrypted the data, the decryption will either fail or return a garbled, i.e., an obfuscated value. The obfuscated value is a result of the registered value scheme handler module receiving the tenant value obfuscation instructions from the tenant value obfuscation instructions module. In addition, for the same data retrieval request, the registered value scheme handler module compares the tenant identifier injected into the data value space with the tenant identifier of the cache key. If the injected tenant identifier is validated, the data value in the shared cache is provided to the first tenant device. If the registered value scheme handler module cannot validate the injected tenant identifier the data value is not provided to the requester.

Accordingly, the cache value space protection scheme facilitates tenants' data separation on the shared cache during data retrieval from the shared cache through a combination of: 1) tenant value validation features to validate the tenant identifier embedded as an attribute to the data value field for the data value that is to be retrieved from the shared cache; and 2) a tenant-specific encryption key that is used to decrypt the data value that is retrieved from the shared cache.

Referring to FIG. 1, a schematic diagram is provided illustrating a multi-tenant computing environment, i.e., a global computing system 100 suitable for allowing access to specified data in a shared cache to authorized tenants, while denying access to the data for unauthorized tenants. In at least one embodiment, the global-computing system 100 is divided into two sides, i.e., a client side 110 and a server side 130.

In at least one embodiment, the client side 110 of the global computing system 100 includes a plurality of tenant devices 112, including a first tenant device 114, a second tenant device 116, and a third tenant device 118, where three tenant devices 112 is non-limiting. The first tenant device 114 includes mobile devices, such as, and not limited to, notebook computers, tablets, and mobile phones. The second tenant device 116 includes, without limitation, laptop computers and mobile devices within a docking station. The third tenant device 118 includes, without limitation, desktop computers. The first tenant (shown as tenant 1 in FIG. 1) is associated with the first tenant device 114 and includes users 1, 2, and 3. The second tenant (shown as tenant 2 in FIG. 1) is associated with the second tenant device 116 and includes users 1, 3, and 4. The third tenant (shown as tenant 3 in FIG. 1) is associated with the third tenant device 118 and includes users 2, 5, and 6. Accordingly, the plurality of tenant devices 112 may include users that use two or more tenant devices 112.

The server side 130 of the global-computing system 100 includes, in at least one embodiment, one or more servers operably coupled to the plurality of tenant devices 112, where one server 132 is shown in FIG. 1. The server 132 includes one or more server storage devices 134 and one or more shared cache 136, where one server storage device 134 and one shared cache 136 are shown in FIG. 1. The shared cache 136 includes a plurality of cache nodes 138, where a first node 140 and a second node 142 are shown in FIG. 1. Each of first node 140 and second node 142 include storage space for storing data for the plurality of tenants. The plurality of cache nodes 138 are arranged in one of a distributed cache configuration or a clustered cache configuration such that each of the first node 140 and the second node 142 are assigned to a specific tenant of the plurality of tenants.

The global computing system 100, in one or more embodiments, includes one or more cloud-based applications, where, in FIG. 1, one cloud-based application 150 is shown. In the embodiment shown in FIG. 1, each of the tenant devices 114, 116, and 118 of the plurality of tenant devices 112 has access to an instance of the cloud-based application 150. The cloud-based application 150 as shown in FIG. 1 is separated into two distinct portions, i.e., a console portion 152 of the application 150 on the client side 110 and a backend server portion 154 of the application 150 on the server side 130. In at least one embodiment, a cache proxy 160 resides in the console portion 152 of the application 150. Alternative embodiments are discussed further herein. The plurality of tenant devices 112 are in operable communication with the console portion 152 of the application 150, and the console portion 152 is in operable communication with the backend server portion 154 of the application 150 through the cache proxy 160. The backend server portion 154 is in operable communication with the shared cache 136. Operation of the cache proxy 160 and the remainder of the global computing system 100 is discussed further herein. Accordingly, in this embodiment, a cache proxy 160 is resident within the console portion 152 of the cloud-based application 150 to enforce separation of client data between authorized tenants and unauthorized tenants to reduce a potential for accidental exposure of one client's data to another client.

Figure 2:
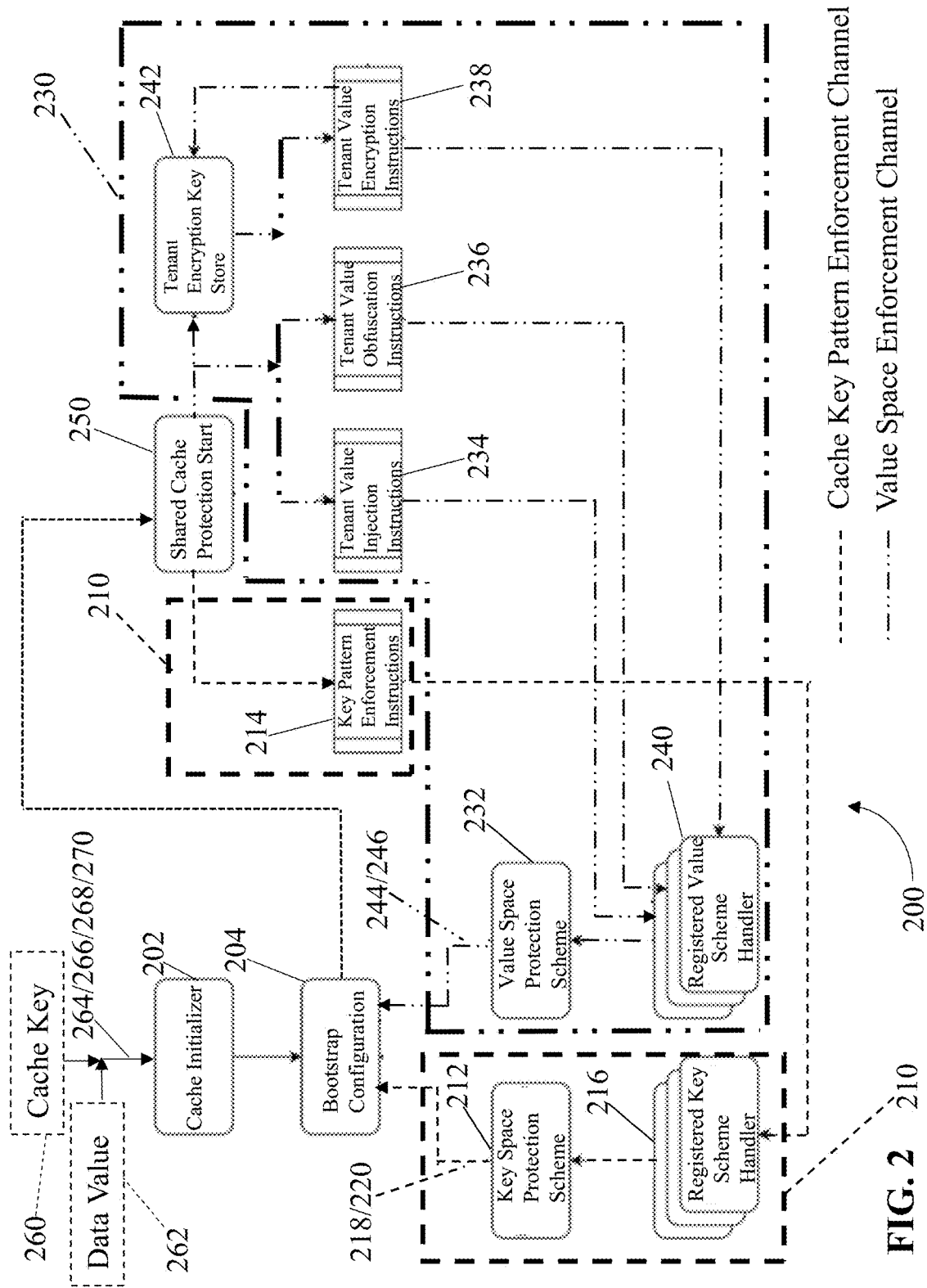
FIG. 2 is a schematic diagram illustrating a cache proxy, in accordance with some embodiments of the present disclosure.

Referring to FIG. 2, a schematic diagram is provided illustrating a cache proxy 200 that is substantially similar to the cache proxy 160. In at least one embodiment, the cache proxy 200 includes a plurality of modules therein that enables the cache proxy 200 as described herein. For example, in one embodiment, the cache proxy 200 includes a cache initializer module 202 that initializes the cache proxy 200 through a bootstrap configuration module 204 that is operably coupled to the cache initializer module 202. The bootstrap configuration module 204 defines which protection scheme (discussed further herein) will be used for a particular tenant of the plurality of tenant devices 112 and the particular data associated therewith. Accordingly, the cache proxy 200 includes the features necessary to initialize the cache proxy 200 and select the appropriate protection schemes to enforce separation of client data between authorized tenants and unauthorized tenants to reduce a potential for accidental exposure of one client's data to another client.

In at least some embodiments, and as discussed further herein, a plurality of concurrent or protection schemes are executed through the cache proxy 200. In at least one embodiment, the cache proxy 200 includes a cache key pattern enforcement channel 210 that generates a cache key space protection scheme 212 configured to enforce proper authentication of a tenant prior to data transmission to and data retrieval from the shared cache 136. The cache key pattern enforcement channel 210 is in operable communication with the bootstrap configuration module 204. The cache key pattern enforcement channel 210 includes a key pattern enforcement instructions module 214 that stores and transmits instructions for enforcing the tenant-specific patterns. The cache key pattern enforcement channel 210 also includes a registered key scheme handler module 216 in operable communication with the key pattern enforcement instructions module 214. The registered key scheme handler module 216 enforces the key space protection scheme 212 and transmits one of a cache key pattern-based protection scheme validation 218 and a cache key pattern-based protection scheme denial 220 to the bootstrap configuration module 204. The key space protection scheme 212 is configured as either a stand-alone scheme or a scheme that is complimentary to one or more additional schemes. Accordingly, at least some embodiments of the cache proxy 200 include features that use enforcement of cache key pattern-based protection to enforce separation of client data between authorized tenants and unauthorized tenants to reduce a potential for accidental exposure of one client's data to another client.

In at least some embodiments, the cache proxy 200 includes a value space enforcement channel 230 that generates a value space protection scheme 232 configured to enforce proper authentication of a tenant prior to data transmission to and data retrieval from the shared cache 136. The value space protection scheme 232 is configured as either a stand-alone scheme or a scheme that is complimentary to one or more additional schemes, including, without limitation, the key space protection scheme 212. The value space enforcement channel 230 is in operable communication with the bootstrap configuration module 204.

The value space enforcement channel 230 includes a plurality of instructions modules similar to the key pattern enforcement instructions module 214. The value space enforcement channel 230 includes a tenant value injection instructions module 234 that stores and transmits instructions for injecting a tenant-specific identifier as an attribute to the data value field for the data value that is to be stored in the shared cache 136. In at least some embodiments, the value space enforcement channel 230 also includes a tenant value obfuscation instructions module 236 that facilitates obfuscating a retrieved value from the shared cache 136 under certain conditions where full validation of the tenant credentials has not been attained. The value space enforcement channel 230 further includes a tenant value encryption instructions module 238 that stores and transmits instructions for encrypting the data values that are to be stored within the shared cache 136. The value space enforcement channel 230 also includes a tenant encryption key store module 242 that generates, stores, and retrieves tenant-specific encryption keys used for encryption and decryption of the data values transmitted to and retrieved from the shared cache 136. The tenant encryption key store module 242 is operably coupled to the tenant value encryption instructions module 238.

In addition, the value space enforcement channel 230 includes a registered value scheme handler module 240 that is in operable communication with the tenant value injection instructions module 234, the tenant value obfuscation instructions module 236, and the tenant value encryption instructions module 238. The registered value scheme handler module 240 enforces the value space protection scheme 232 and transmits one of a value-based protection scheme validation 244 and a value-based protection scheme denial 246 to the bootstrap configuration module 204. In the illustrated embodiment, the cache key enforcement channel 210 and the value space enforcement channel 230 are initiated through a shared cache protection start module 250 that is operably coupled to the bootstrap configuration module 204. Accordingly, at least some embodiments of the cache proxy 200 include features that use enforcement of data value-based protection to enforce separation of client data between authorized tenants and unauthorized tenants to reduce a potential for accidental exposure of one client's data to another client.

Figure 3:
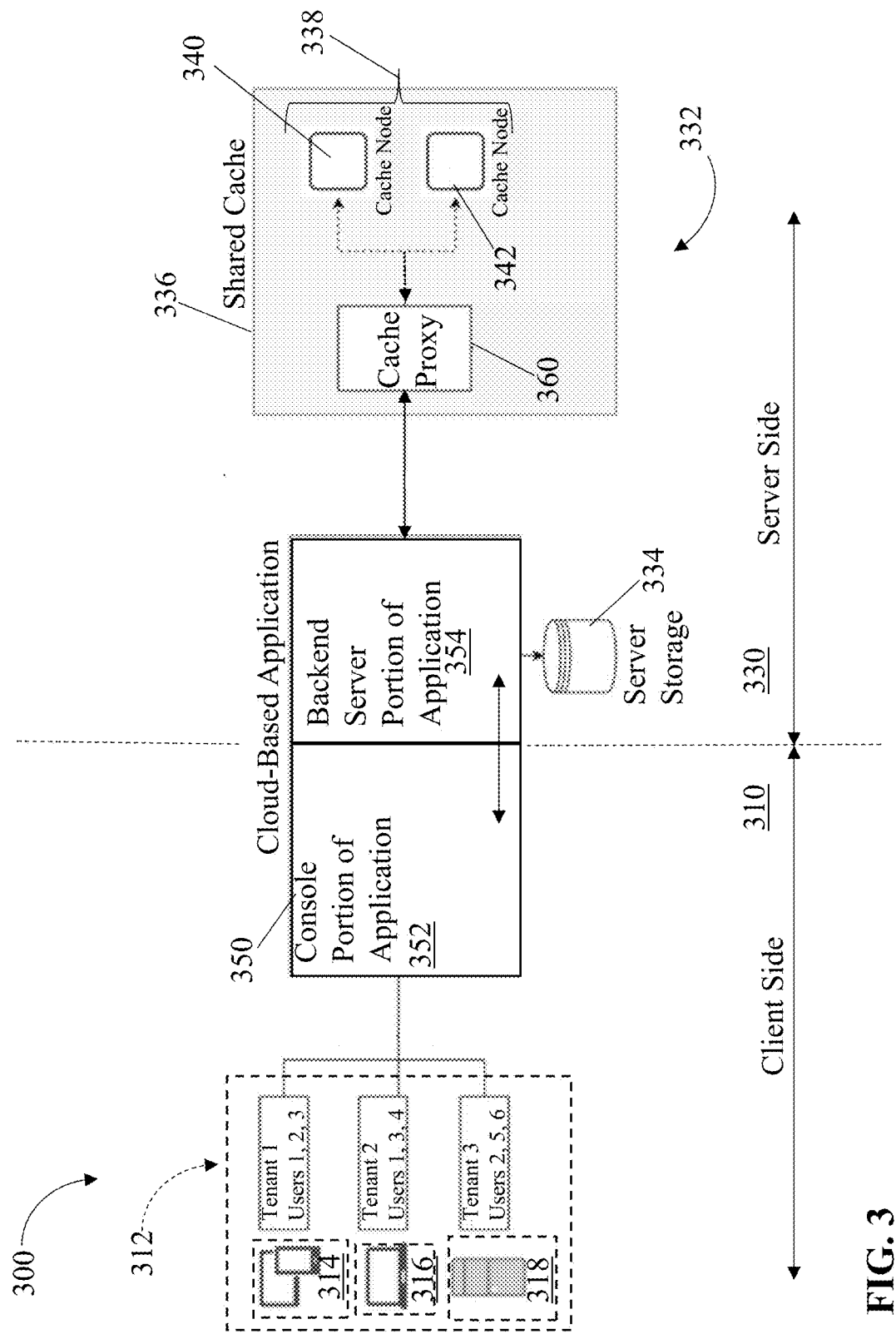
FIG. 3 is a schematic diagram illustrating an alternative multi-tenant computing environment, in accordance with some embodiments of the present disclosure.

Referring to FIG. 3, a schematic diagram is provided illustrating an alternative multi-tenant computing environment, i.e., a global computing system 300 suitable for allowing access to specified data in a shared cache to authorized tenants, while denying access to the data for unauthorized tenants. In at least one embodiment, the global-computing system 300 is divided into two sides, i.e., a client side 310 and a server side 330.

In at least one embodiment, the client side 310 of the global computing system 300 includes a plurality of tenant devices 312, including a first tenant device 314, a second tenant device 316, and a third tenant device 318, where three tenant devices 312 is non-limiting. The plurality of tenant devices 312 are substantially similar to the plurality of tenant devices 112. The first tenant, second tenant, and the third tenant, and the associated users are substantially similar to those discussed with respect to FIG. 1.

The server side 330 of the global-computing system 300 includes, in at least one embodiment, one or more servers operably coupled to the plurality of tenant devices 312, where one server 332 is shown in FIG. 3. The server 332 includes one or more server storage devices and one or more shared cache 336, where one server storage device 334 and one shared cache 336 are shown in FIG. 3. The shared cache 336 includes a plurality of cache nodes 338, where a first node 340 and a second node 342 are shown in FIG. 3. The first node 340 and the second node 342 are substantially similar to the first node 140 and the second node 142, respectively, and discussed with respect to FIG. 1.

The global computing system 300, in one or more embodiments, includes one or more cloud-based applications, where, in FIG. 3, one cloud-based application 350 is shown. In the embodiment shown in FIG. 3, each of the tenant devices 314, 316, and 318 of the plurality of tenant devices 312 has access to an instance of the cloud-based application 350. The cloud-based application 350 as shown in FIG. 3 is separated into two distinct portions, i.e., a console portion 352 of the application 350 on the client side 310 and a backend server portion 354 of the application 350 on the server side 330.

In at least one embodiment, a cache proxy 360 resides in the shared cache 336. The cache proxy 360 is in operable communication with the backend server portion 354 of the application 350 and the plurality of cache nodes 338 in the shared cache 336. The cache proxy 360 is substantially similar to the cache proxy 160. In the topology of FIG. 3, the backend server portion 354 of the application 350 establishes a secure connection with the cache proxy 360. As compared to the configuration described with respect to the cache proxy 160 in FIG. 1, the configuration of the cache proxy 360 resident within the shared cache 336 provides for increased security and control over accessing the shared cache 336. Such benefits are derived through positioning the cache proxy 360 closer to the data within the shared cache 336 to mitigate any effects of potential bypassing of the access controls within the cloud-based application 350.

Figure 4:
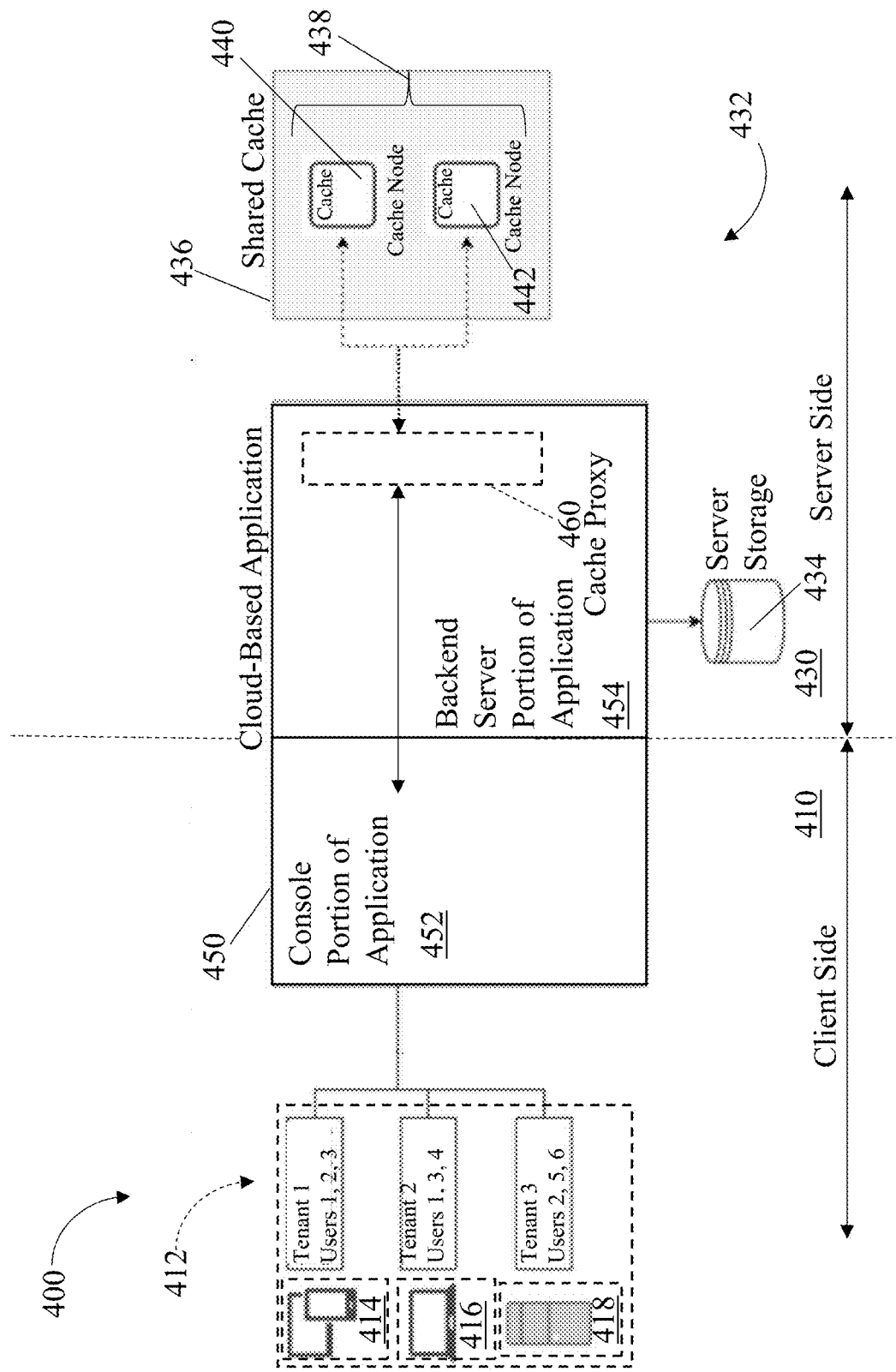
FIG. 4 is a schematic diagram illustrating another alternative multi-tenant computing environment, in accordance with some embodiments of the present disclosure.

Referring to FIG. 4, a schematic diagram is provided illustrating another alternative multi-tenant computing environment, i.e., a global computing system 400 suitable for allowing access to specified data in a shared cache to authorized tenants, while denying access to the data for unauthorized tenants. In at least one embodiment, the global computing system 400 is divided into two sides, i.e., a client side 410 and a server side 430.

In at least one embodiment, the client side 410 of the global computing system 400 includes a plurality of tenant devices 412, including a first tenant device 414, a second tenant device 416, and a third tenant device 418, where three tenant devices 412 is non-limiting. The plurality of tenant devices 412 are substantially similar to the plurality of tenant devices 112. The first tenant, second tenant, and the third tenant, and the associated users are substantially similar to those discussed with respect to FIG. 1.

The server side 430 of the global computing system 400 includes, in at least one embodiment, one or more servers operably coupled to the plurality of tenant devices 412, where one server 432 is shown in FIG. 4. The server 432 includes one or more server storage devices and one or more shared cache 436, where one server storage device 434 and one shared cache 436 are shown in FIG. 3. The shared cache 436 includes a plurality of cache nodes 438, where a first node 440 and a second node 442 are shown in FIG. 4. The first node 440 and the second node 442 are substantially similar to the first node 140 and the second node 142, respectively, and discussed with respect to FIG. 1.

The global computing system 400, in one or more embodiments, includes one or more cloud-based applications, where, in FIG. 4, one cloud-based application 450 is shown. In the embodiment shown in FIG. 4, each of the tenant devices 414, 416, and 418 of the plurality of tenant devices 412 has access to an instance of the cloud-based application 450. The cloud-based application 450 as shown in FIG. 4 is separated into two distinct portions, i.e., a console portion 452 of the application 450 on the client side 410 and a backend server portion 454 of the application 450 on the server side 430. In at least one embodiment, a cache proxy 460 resides in the backend server portion 454 of the application 450. The cache proxy 460 is substantially similar to the cache proxy 160. The plurality of tenant devices 112 are in operable communication with the console portion 152 of the application 150, and the console portion 152 is in operable communication with the backend server portion 154 of the application 150, which in turn is in operable communication with the shared cache 436 through the cache proxy 460. As compared to the configuration described with respect to the cache proxy 360 in FIG. 3, the configuration of the cache proxy 460 resident within the server portion 454 of the application 450 provides for increased security and control over accessing the shared cache 436. Such benefits are derived through positioning the cache proxy 460 further from the tenants on the console portion 452 of the application and closer to the data in the shared cache 436 to mitigate any potential bypassing of the access controls in the console portion 452 of the cloud-based application 450.

Figure 5:
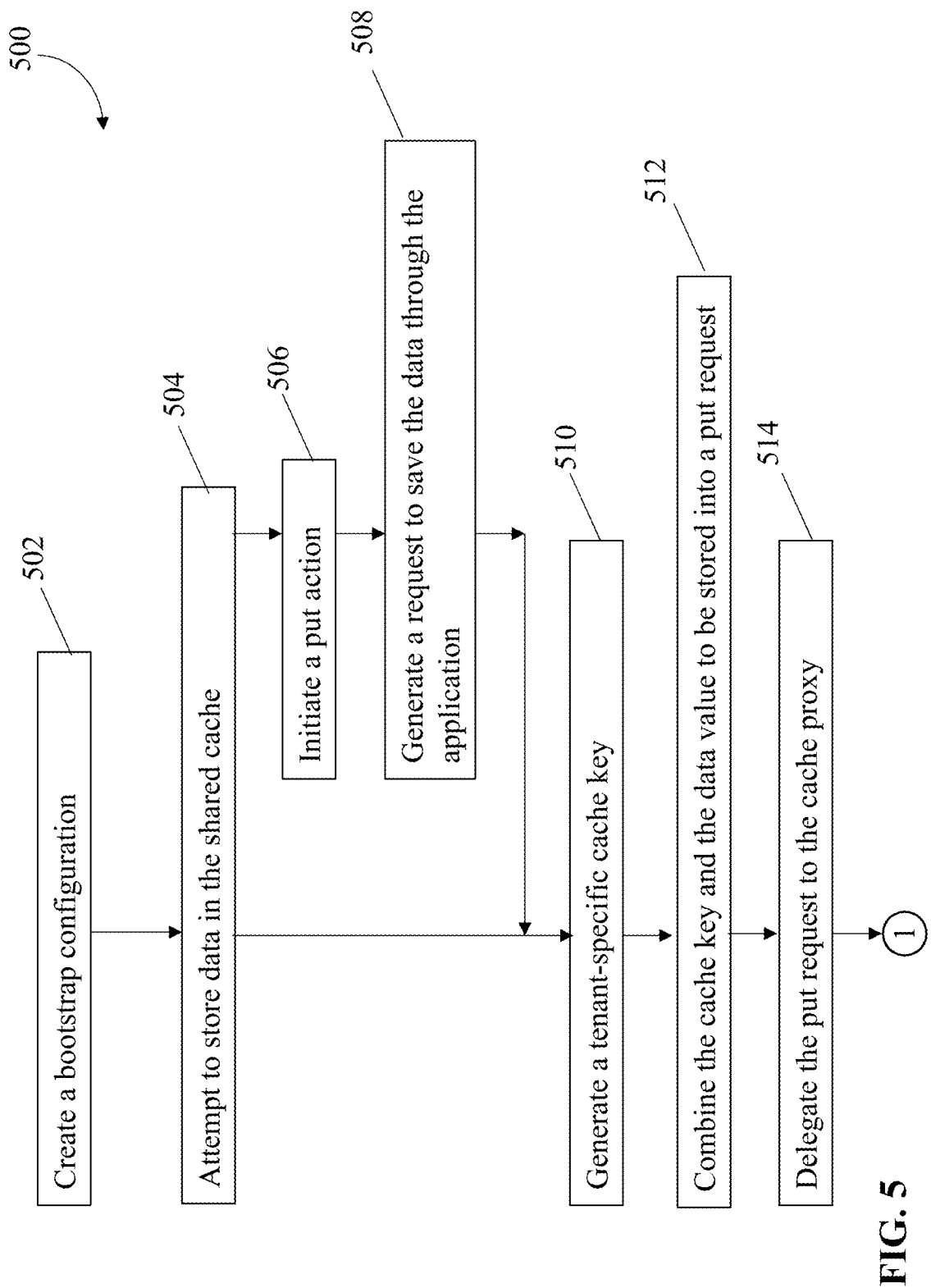
FIG. 5 is a flow chart illustrating a process for transferring data to the stored cache through a key space protection scheme, in accordance with some embodiments of the present disclosure.
Figure 5:
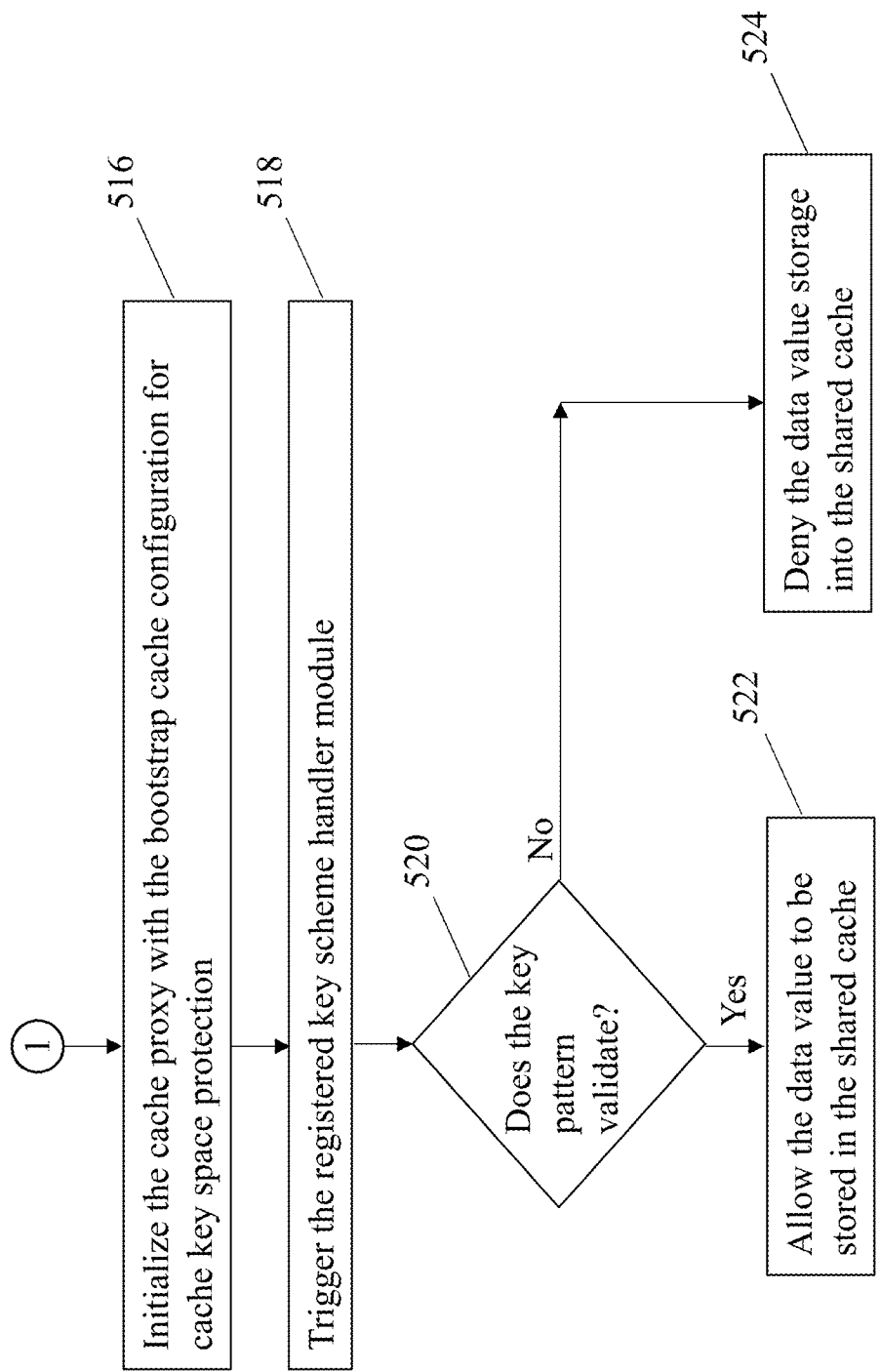

Referring to FIG. 5, and FIGS. 1 and 2, a flow chart is provided illustrating a process 500 for transferring data to the stored cache 136 through a cache key space protection scheme 212. A bootstrap configuration is created 502 by the cloud-based application 150 and stored in the boot strap configuration module 204 within the cache proxy 200. The bootstrap configuration defines the cache key space protection scheme 212 as directed by at least one of the associated tenant and the SaaS provider. The cache key space protection scheme 212 is a schema/pattern enforcement feature directed toward ensuring that all cache keys, including a first tenant-specific cache key 260, are properly formed with respect to including one or more unique credentials in the form of a predetermined specific pattern for the sequence of values therein. The values include a first tenant-specific tenant identifier, i.e., a tenant identifier. In at least one embodiment, and without limitation, the first tenant-specific cache key 260 has a specific format restricted to {User1-Tenant1-<key-name>}, where the "User1" portion is a specific sequence of values that identifies the user 1, "Tenant1" is a specific sequence of values that define the tenant identification for the first tenant, and the key-name is a specific sequence of values that define the identification of the first tenant-specific cache key 260.

In at least one embodiment, the "User1" sequence of values is a user log-on identification for attaining access to the cloud-based application 150 through the first tenant device 114 that is either selected by the first user or assigned to the first user by the tenant 1. In at least one embodiment, the tenant identifier is an account identification provided by the SaaS provider. In at least some other embodiments, e.g., in the case of a user-centric shared cache, the tenant identifier is the user's user identifier. In at least one embodiment, the "User1" sequence of values and the "Tenant1" sequence of values are different for user 1 when user 1 is operating the second tenant device 116 for tenant 2. Therefore, even for the same users, access will be different for different tenants. Use of the first tenant-specific cache key 260 to facilitate all potential accessors to the shared cache 136 to be validated by the cache proxy 200 though the schema of the first tenant-specific cache key 260 before allowing either put or get operations to occur is discussed further herein. Accordingly, protecting the key space for the shared cache 136 is enabled through the cache key space protection scheme 212, resident within the cache proxy 200, and through enforcing pattern constraints on the first tenant-specific cache key 260 and requiring inclusion of the individual tenant identifier.

A data value 262 is created and used through the console portion 152, i.e., a client side 110 of an instance of the cloud-based application 150 by, for example, user 1 through the first tenant device 114 belonging to the first tenant, i.e., tenant 1. Notably, user 1 has access to the shared cache 136 through another instance of the cloud-based application 150 through the second tenant device 116 owned by the second tenant, i.e., tenant 2. User 1 attempts 504 to store the data value 262 in the shared cache 136 through the first tenant device 114 by initiating 506 a put action. User 1 generates 508 a request 170 to save the data value on the shared cache 136 through the console portion 152 of the application 150. Upon receipt of the put request 170, and prior to placing the data value in the shared cache 136, the first tenant-specific cache key 260 is generated 510 by the console portion 152 of the application 150. In at least one embodiment, and without limitation, and as described herein, the first tenant-specific cache key 260 has a specific format restricted to {User1-Tenant1-<key-name>}. The first tenant-specific cache key 260 is shown in phantom in FIG. 2 to indicate that it is created external to the cache proxy 200.

In at least some embodiments, the cloud-based application 150 combines 512 the first tenant-specific cache key 260 and the data value 262 to be stored to form a {key,value} put request 264, where the put request 264 is substantially similar to the put request 170 shown in FIG. 1. The cloud-based application 150 delegates 514 the put request 264 to the cache proxy 200. Upon receipt of the put request 264 by the cache proxy 200, the put request 264 is executed through the cache key space protection scheme 212 by initializing 516 the cache proxy 200 through initialization of the cache proxy 200 through initiation of the bootstrap configuration module 204 via the console portion 152 of the application 150 through a "hand-off" to the cache initializer module 202 in the cache proxy 200. The bootstrap configuration generated as described herein, is directed toward enforcement of the cache key space protection scheme 212 to ensure that the first tenant-specific cache key 260 follows only the designated pattern.

The bootstrap configuration is created by the cloud-based application 150 with the shared cache 136 configuration, therefore the cache proxy 200 is configured to recognize that the shared cache 136 is configured with a pattern-based key scheme. The bootstrap configuration module 204 will trigger the shared cache protection start module 250 that will in turn trigger 518 the registered key scheme handler module 216 to attempt 520 to validate the pattern of the cache key 260. The registered key scheme handler module 216 executes the key pattern enforcement instructions from the key pattern enforcement instructions module 214 through the key space protection scheme 212. If the credentials associated with the first tenant are validated, i.e., the pattern of the cache key 260 and the first tenant-specific tenant identifier therein are validated, the validation is transmitted to the bootstrap configuration module 204 through the cache key pattern-based protection scheme validation 218. The data value 262 is stored 522 in the shared cache 136 as indicated by arrows 172 and 174 in FIG. 1. If the registered key scheme handler module 216 cannot validate the pattern of the cache key 260 to the tenant-specific pattern, or, the tenant identifier does not match the first tenant-specific tenant identifier, the credentials are not validated by the key space protection scheme 212, a denial is transmitted to the bootstrap configuration module 204 through the cache key pattern-based protection scheme denial 220, and the data value 262 is denied 524 storage in the shared cache 136. Accordingly, the cache key space protection scheme 212 facilitates tenants' data separation on the shared cache 136 during data storage to the shared cache 136 through enforcing a specific pattern of the tenant-specific cache key 260, including the correct tenant identifier therein.

Figure 6:
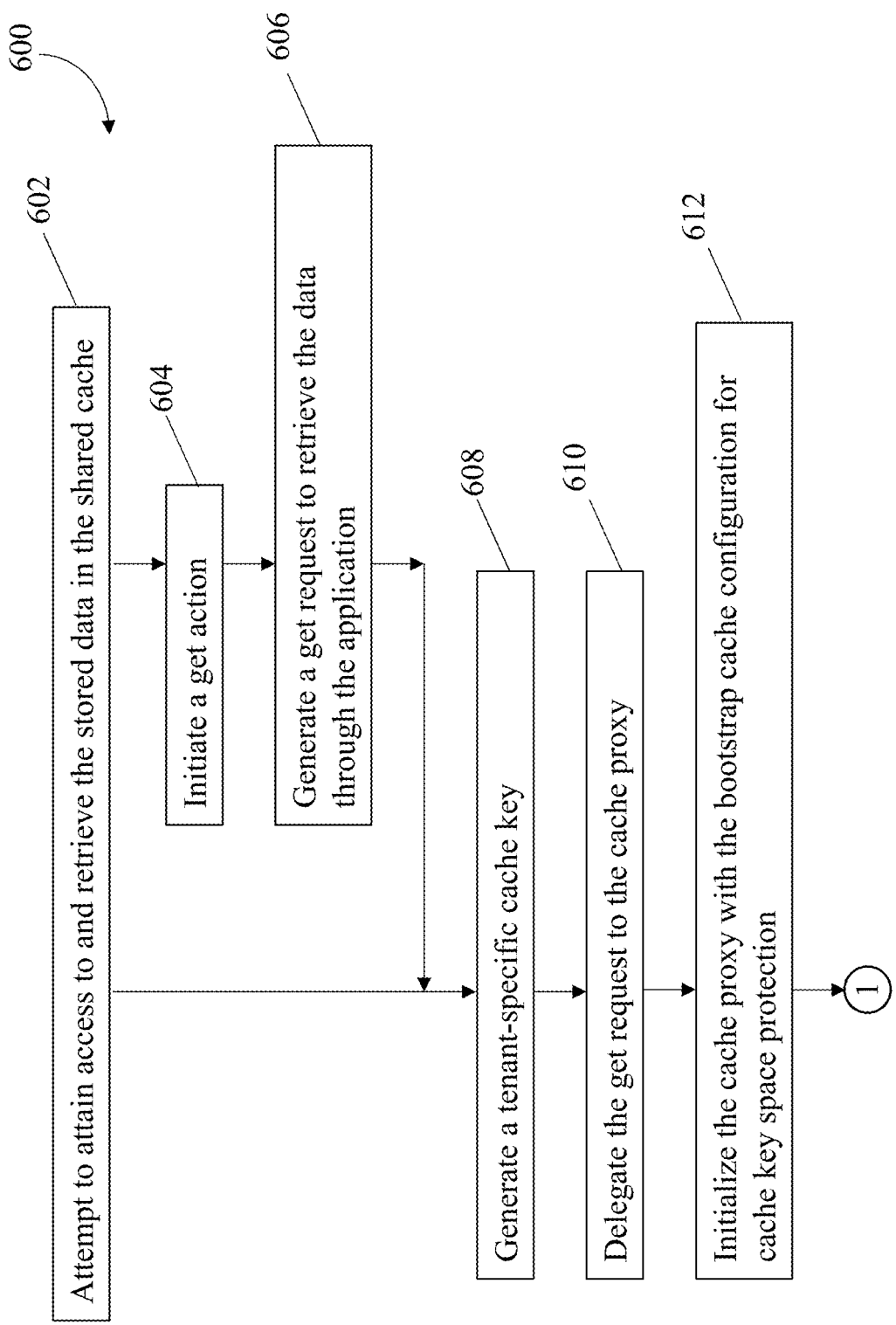
FIG. 6 is a flow chart illustrating a process for retrieving data from the stored cache through the key space protection scheme, in accordance with some embodiments of the present disclosure.
Figure 6:
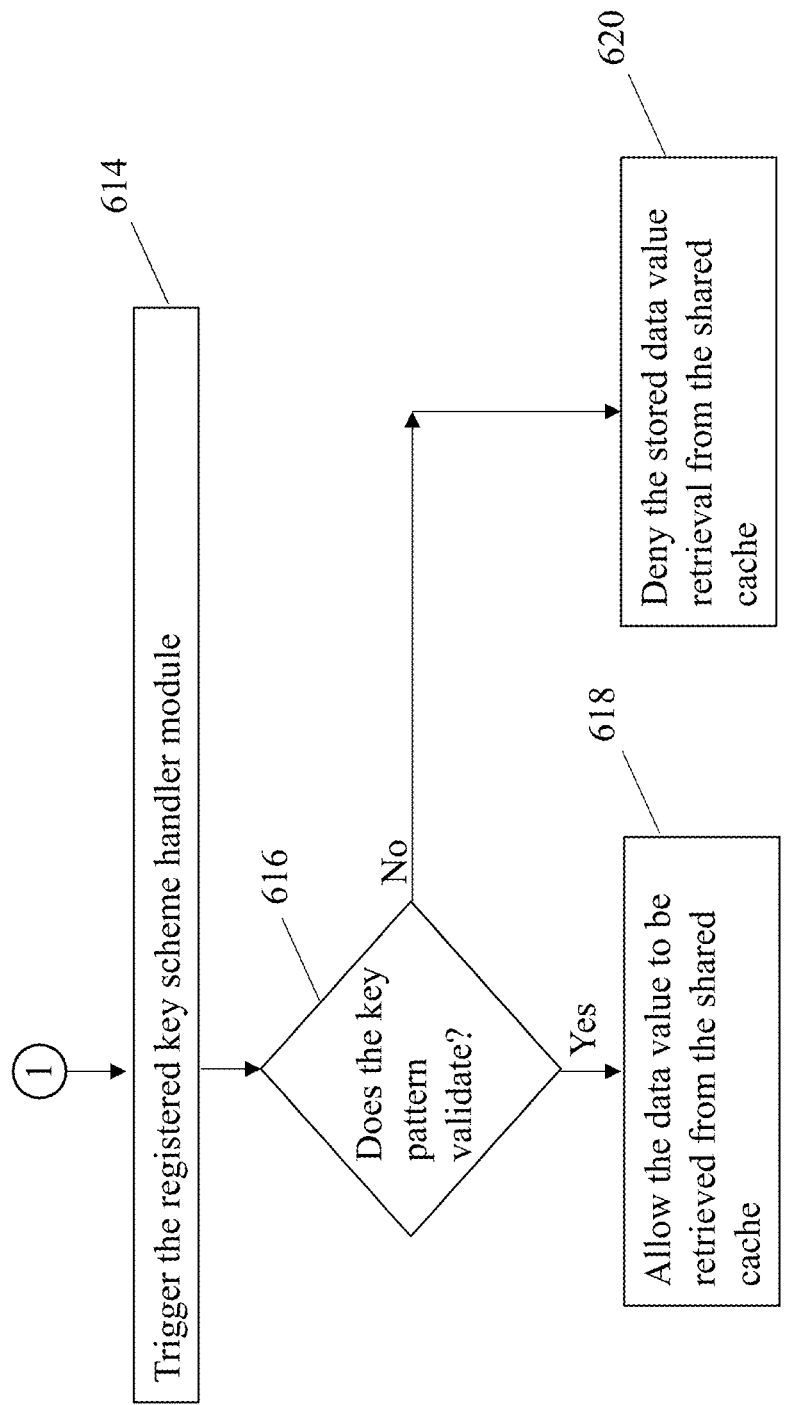

Referring to FIG. 6, and FIGS. 1 and 2, a flow chart is provided illustrating a process 600 for retrieving data from the stored cache 136 through the key space protection scheme 212. In at least one embodiment, the first tenant will attempt 602 to attain access to, and retrieve, the first tenant's data on the shared cache 136 through the console portion 152 of the associated instance of the cloud-based application 150. In one embodiment, such data, e.g., and without limitation, the data value 262, is stored on the shared cache 136 by the first tenant through the put process 500 with respect to FIG. 5. User 1 attempts 602 to retrieve the data value 262 stored in the shared cache 136 through the first tenant device 114 by initiating 604 a get action. The first tenant will generate 606 a request to access and retrieve the data on the shared cache through the cloud-based application 150, i.e., a get request 180. The get request 180 includes the tenant-specific cache key, that in turn includes the credentials specific to the first tenant for data retrieval.

Upon receipt of the get request 180, and prior to retrieving the data value 262 in the shared cache 136, the first tenant-specific cache key 260 is generated 608 by the console portion 152 of the application 150. In at least one embodiment, and without limitation, and as described herein, the first tenant-specific cache key 260 has a specific format restricted to {User1-Tenant1-<key-name>}. The first tenant-specific cache key 260 is shown in phantom in FIG. 2 to indicate that it is created external to the cache proxy 200.

In at least some embodiments, the cloud-based application 150 uses the first tenant-specific cache key 260 to form a get request 266, where the get request 266 is substantially similar to the get request 180 shown in FIG. 1. The cloud-based application 150 delegates 610 the get request 266 to the cache proxy 200. Upon receipt of the get request 266 by the cache proxy 200, the get request 266 is executed through the cache key space protection scheme 212 by initializing 612, the cache proxy 200 through initializing the bootstrap configuration module 204 via the console portion 152 of the application 150 through a "hand-off" to the cache initializer module 202 in the cache proxy 200. The bootstrap configuration that is generated as described herein, and stored in the bootstrap configuration module, is directed toward enforcement of the cache key space protection scheme 212 to ensure that the first tenant-specific cache key 260 follows only the designated pattern.

The bootstrap configuration module 204 will trigger the shared cache protection start module 250 that will in turn trigger 614 the registered key scheme handler module 216 to attempt 616 to validate the pattern of the cache key 260. The registered key scheme handler module 216 executes the key pattern enforcement instructions from the key pattern enforcement instructions module 214 through the key space protection scheme 212. If the credentials associated with the first tenant are validated, i.e., the pattern of the cache key 260 and the first tenant-specific tenant identifier are validated, the validation is transmitted to the bootstrap configuration module 204, through the cache key pattern-based protection scheme validation 218. The data value 262 (shown as 182 in FIG. 1) is retrieved 618 from the shared cache 136 through the cloud-based application and is transmitted to the user 1 as indicated by arrows 184 and 186 in FIG. 1. If the registered key scheme handler module 216 cannot validate the pattern of the cache key 260 to the tenant-specific pattern, or, the tenant identifier does not match the first tenant-specific tenant identifier, the credentials are not validated by the key space protection scheme 212, a denial is transmitted to the bootstrap configuration module 204, through the cache key pattern-based protection scheme denial 220. and retrieval of the data value 262 from the shared cache 136 is denied 620. Accordingly, the cache key space protection scheme 212 facilitates tenants' data separation on the shared cache 136 during attempted data retrieval from the shared cache 136 through enforcing a specific pattern of the tenant-specific cache key 260, including the correct tenant identifier.

Figure 7:
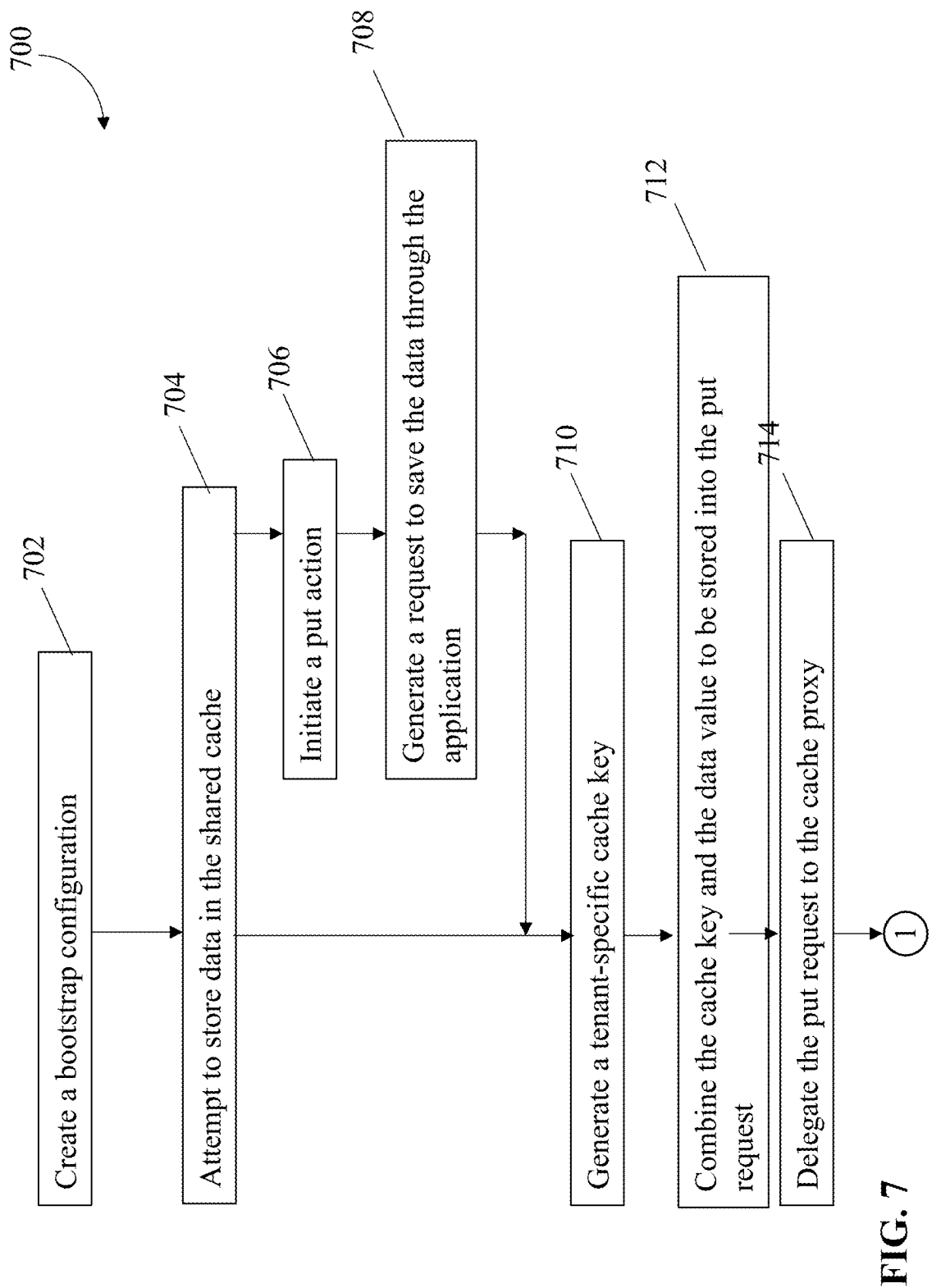
FIG. 7 is a flow chart illustrating a process for transferring encrypted data to the stored cache through a value space protection scheme, in accordance with some embodiments of the present disclosure.
Figure 7:
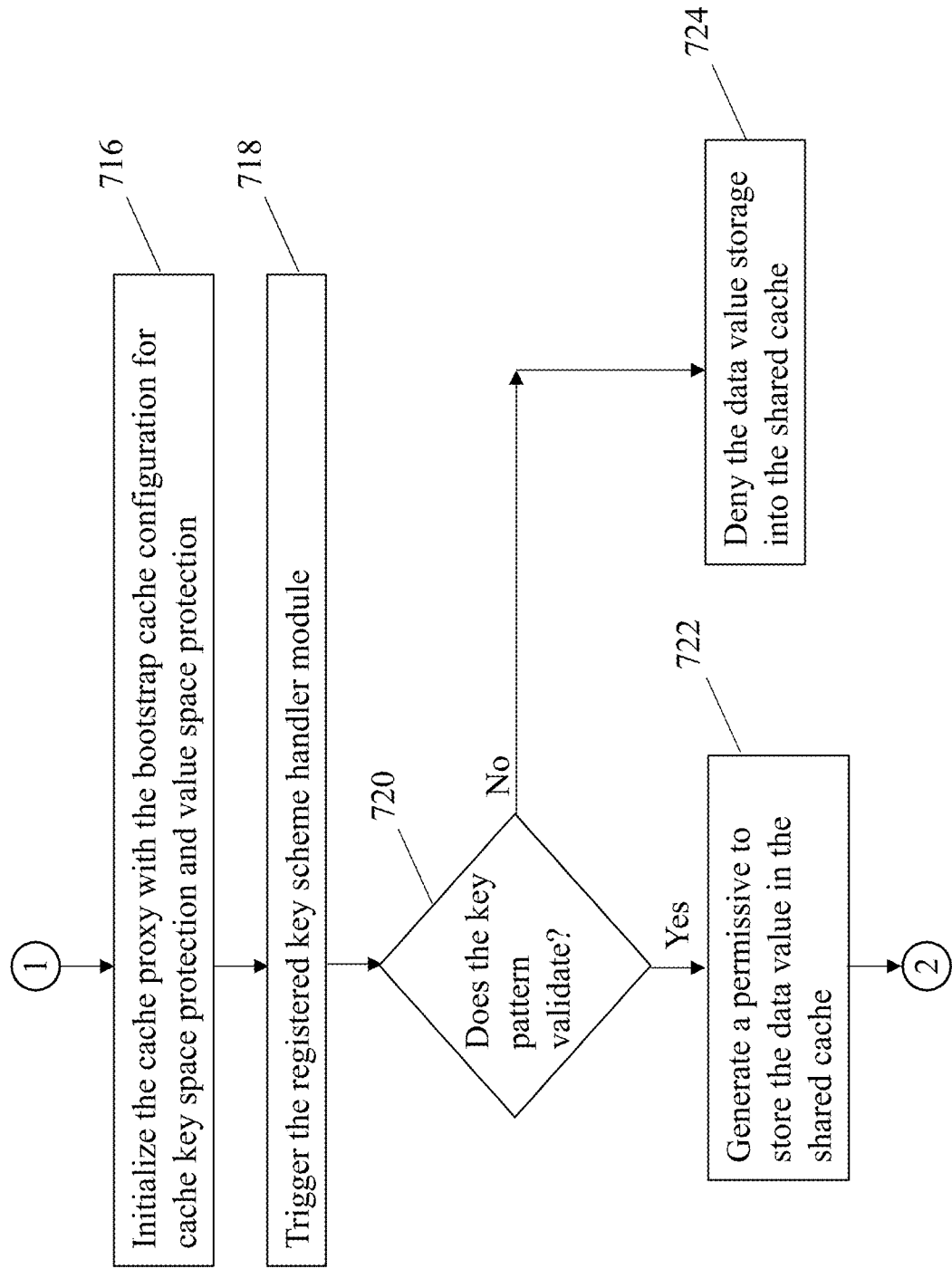
Figure 7:
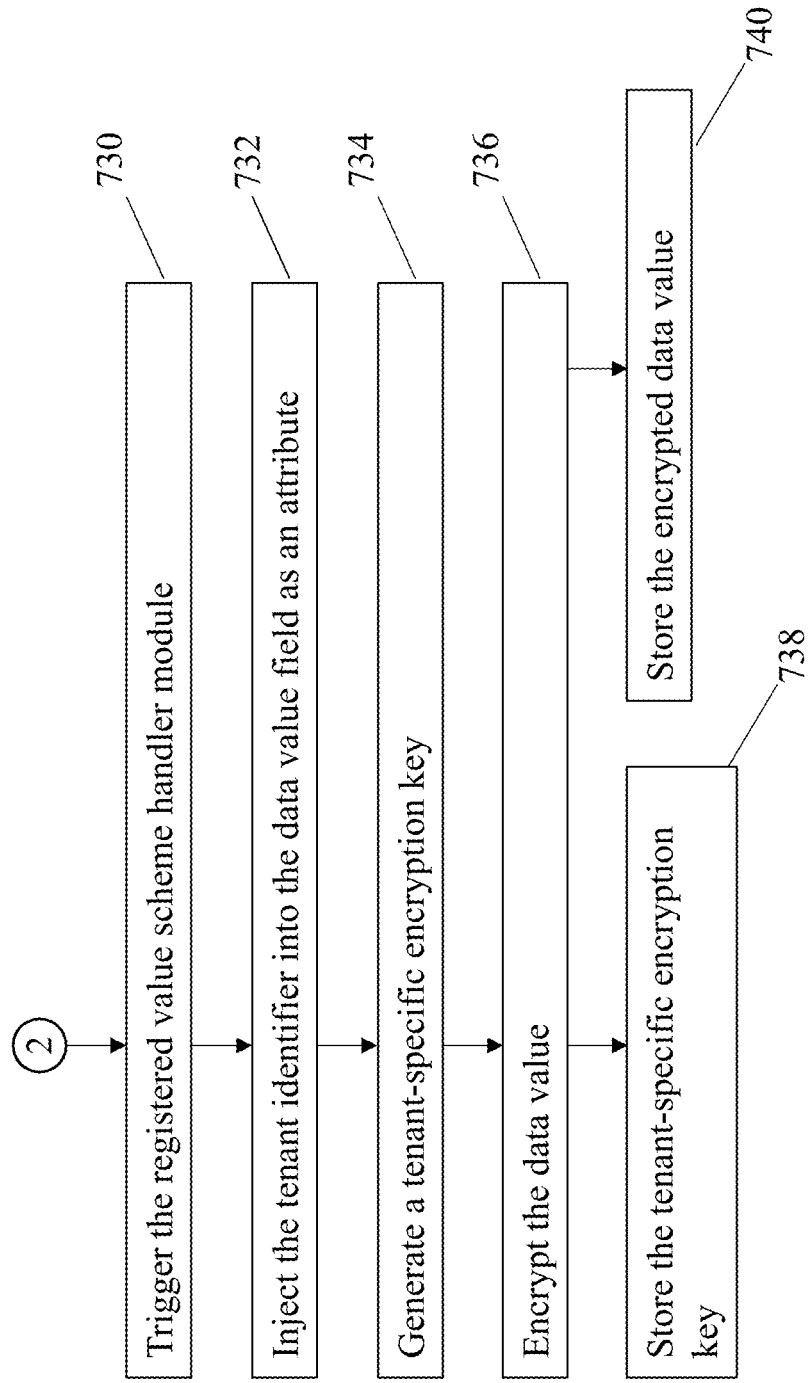

Referring to FIG. 7, and FIGS. 1 and 2, a flow chart is provided illustrating a process 700 for transferring encrypted data to the stored cache through the value space protection scheme 232. In addition to the cache key space protection scheme 212 as described with respect to FIGS. 5 and 6, at least some embodiments of the cache proxy 200 also include the value space protection scheme 232 that, in at least some embodiments, is used in conjunction with the cache key space protection scheme 212. In some embodiments, the value space protection scheme 232 is a stand-alone scheme.

A bootstrap configuration is created 702 by the cloud-based application 150 and stored in the boot strap configuration module 204 within the cache proxy 200. The bootstrap configuration defines the cache key space protection scheme 212 and the value space protection scheme 232, both as directed by at least one of the associated tenant and the SaaS provider. The data value 262 is created and used by user 1 as described herein with respect to FIG. 5.

User 1 attempts 704 to store the data value 262 in the shared cache 136 through the first tenant device 114 by initiating 706 a put action. User 1 generates 708 the request 170 to save the data value on the shared cache 136 through the console portion 152 of the application 150. Upon receipt of the put request 170, and prior to placing the data value in the shared cache 136, the first tenant-specific cache key 260 is generated 710 by the console portion 152 of the application 150. In at least one embodiment, and without limitation, and as described herein, the first tenant-specific cache key 260 has a specific format restricted to {User1-Tenant1-<keyname>}. The first tenant-specific cache key 260 is shown in phantom in FIG. 2 to indicate that it is created external to the cache proxy 200.

In at least some embodiments, the cloud-based application 150 combines 712 the first tenant-specific cache key 260 and a data value 262 to be stored to form a {key,value} put request 268, where the put request 268 is substantially similar to a put request 188 shown in FIG. 1. The cloud-based application 150 delegates 714 the put request 268 to the cache proxy 200. Upon receipt of the put request 268 by the cache proxy 200, the put request 268 is executed through the cache key space protection scheme 212 and the value space protection scheme 232 by initializing 716 the cache proxy 200 through initializing the bootstrap configuration module 204 via the console portion 152 of the application 150 through a "hand-off" to the cache initializer module 202 in the cache proxy 200. The initialization 716 initializes both the cache key space protection scheme 212 and the value space protection scheme 232. The bootstrap configuration generated as described elsewhere herein, is directed toward enforcement of the cache key space protection scheme 212 and the value space protection scheme 232.

The bootstrap configuration module 204 triggers the shared cache protection start module 250 that will in turn trigger 718 the registered key scheme handler module 216 to attempt 720 to validate the pattern of the cache key 260. The registered key scheme handler module 216 executes the key pattern enforcement instructions from the key pattern enforcement instructions module 214 through the key space protection scheme 212. If the credentials associated with the first tenant are validated, i.e., the pattern of the cache key 260 and the first tenant-specific tenant identifier are validated, the validation is transmitted to the bootstrap configuration module 204 as the cache key pattern-based protection scheme validation 218. A permissive to store the data value 262 in the shared cache 136 is generated 722 and is transmitted with the cache key pattern-based protection scheme validation 218 to the bootstrap configuration module 204. If the registered key scheme handler module 216 cannot validate the pattern of the cache key 260 to the tenant-specific pattern, or, the tenant identifier does not match the first tenant-specific tenant identifier, the credentials are not validated by the key space protection scheme 212, a denial is transmitted to the bootstrap configuration module 204 through the cache key pattern-based protection scheme denial 220, and the data value 262 is denied 724 storage in the shared cache 136. Accordingly, the cache key space protection scheme 212 will prevent improper or unauthorized data storage prior to use of the value space protection scheme 232 through enforcing a specific pattern of the tenant-specific cache key 260, including the correct tenant identifier therein, prior to employing the value space protection scheme 232. Therefore, in at least one embodiment, the cache key space protection scheme 212 and the value space protection scheme 232 are executed in tandem.

In at least some embodiments, in addition to exercising the key space protection scheme 212, the value space protection scheme 232 is executed to fulfill the put request 188/268. As described elsewhere herein, upon receipt of the cache key pattern-based protection scheme validation 218, indicative of the storage permissive, the bootstrap configuration module 204 again triggers the shared cache protection start module 250 that will in turn trigger 730 the registered value scheme handler module 240 to execute the tenant value injection instructions from the tenant value injection instructions module 234. The tenant identifier is injected 732 as an attribute to the data value field for the data value 262 that is to be stored in the shared cache 136. Therefore, the put request 188/268 as initially transmitted to the cache proxy 200 from the cloud-based application 150 including the first tenant-specific cache key 260 and the data value 262 to be stored is amended to include the tenant-specific identifier tagged to the data value such that the put request 268 takes the form of {User1-Tenant1-<key-name>, {value: <value>, tenantid: Tenant1} } to define an amended put request 190.

In addition to the tenant value injection, the registered value scheme handler module 240 receives tenant value encryption instructions from the tenant value encryption instructions module 238. The registered value scheme handler module 240 generates 734 a tenant-specific encryption key that is used to encrypt 736 the data value to create the encrypted data value 192. The tenant-specific encryption key is stored 738 in the tenant encryption key store module 242 and the encrypted data value 192 is stored 740 within the shared cache 136. Accordingly, the cache value space protection scheme 232 facilitates tenants' data separation on the shared cache 136 during data storage to the shared cache 136 through a combination of: 1) tenant value injection features to add the tenant identifier as an attribute to the data value field for the data value that is to be stored in the shared cache; and 2) a tenant-specific encryption key that is used to encrypt the data value that is to be stored in the shared cache 136.

Figure 8:
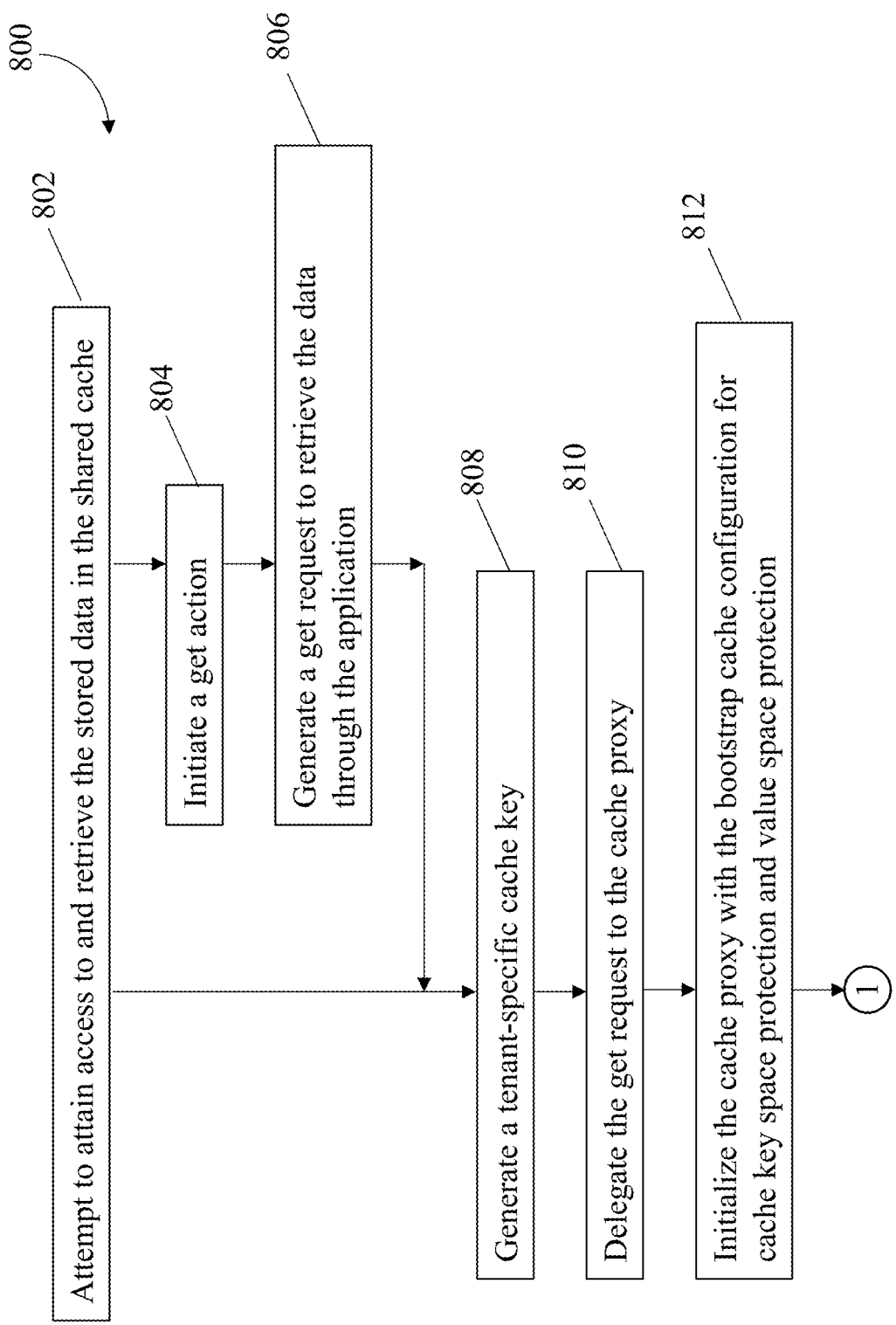
FIG. 8 is a flow chart illustrating a process for retrieving encrypted data from the stored cache through a value space protection scheme, in accordance with some embodiments of the present disclosure.
Figure 8:
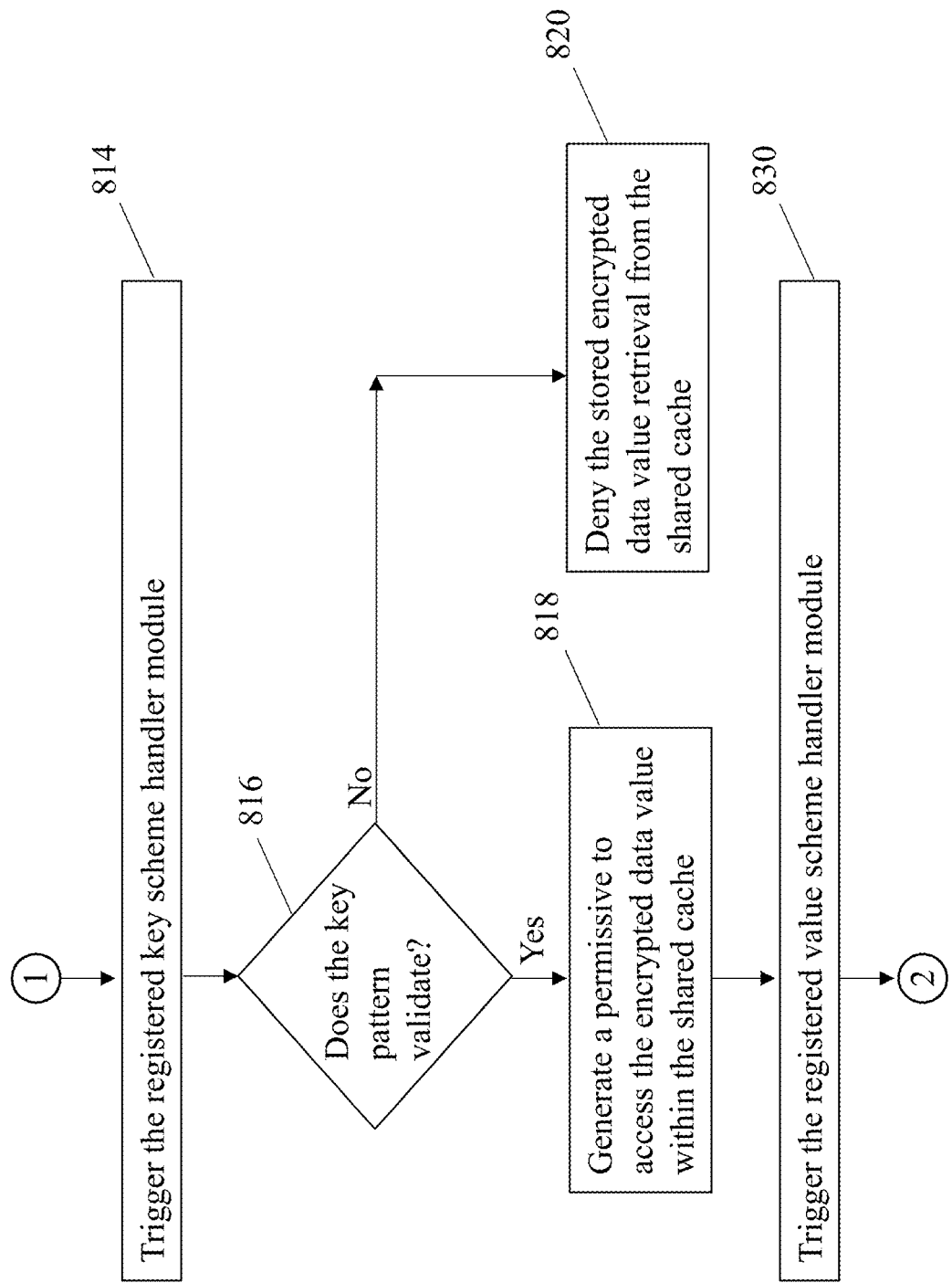
Figure 8:
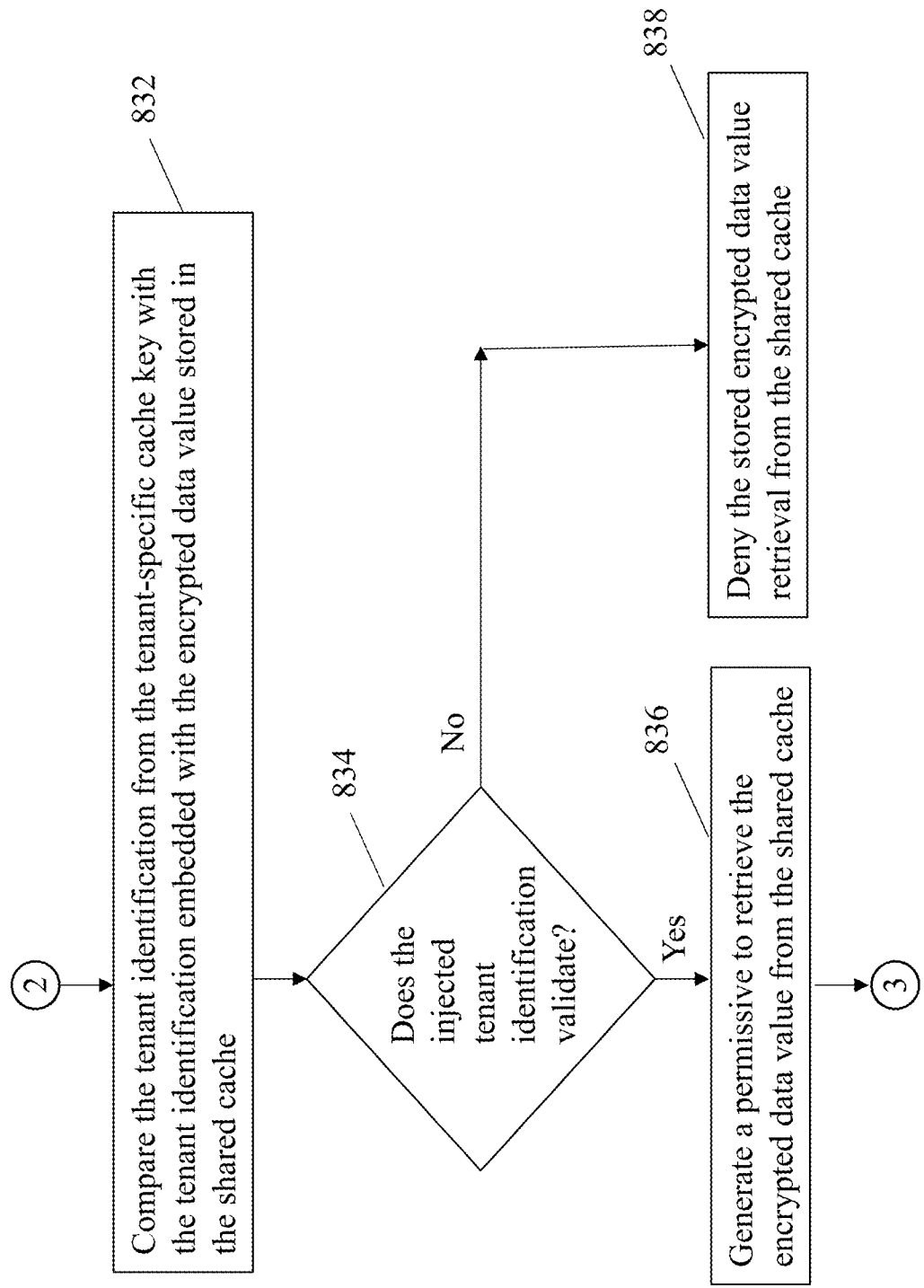
Figure 8:
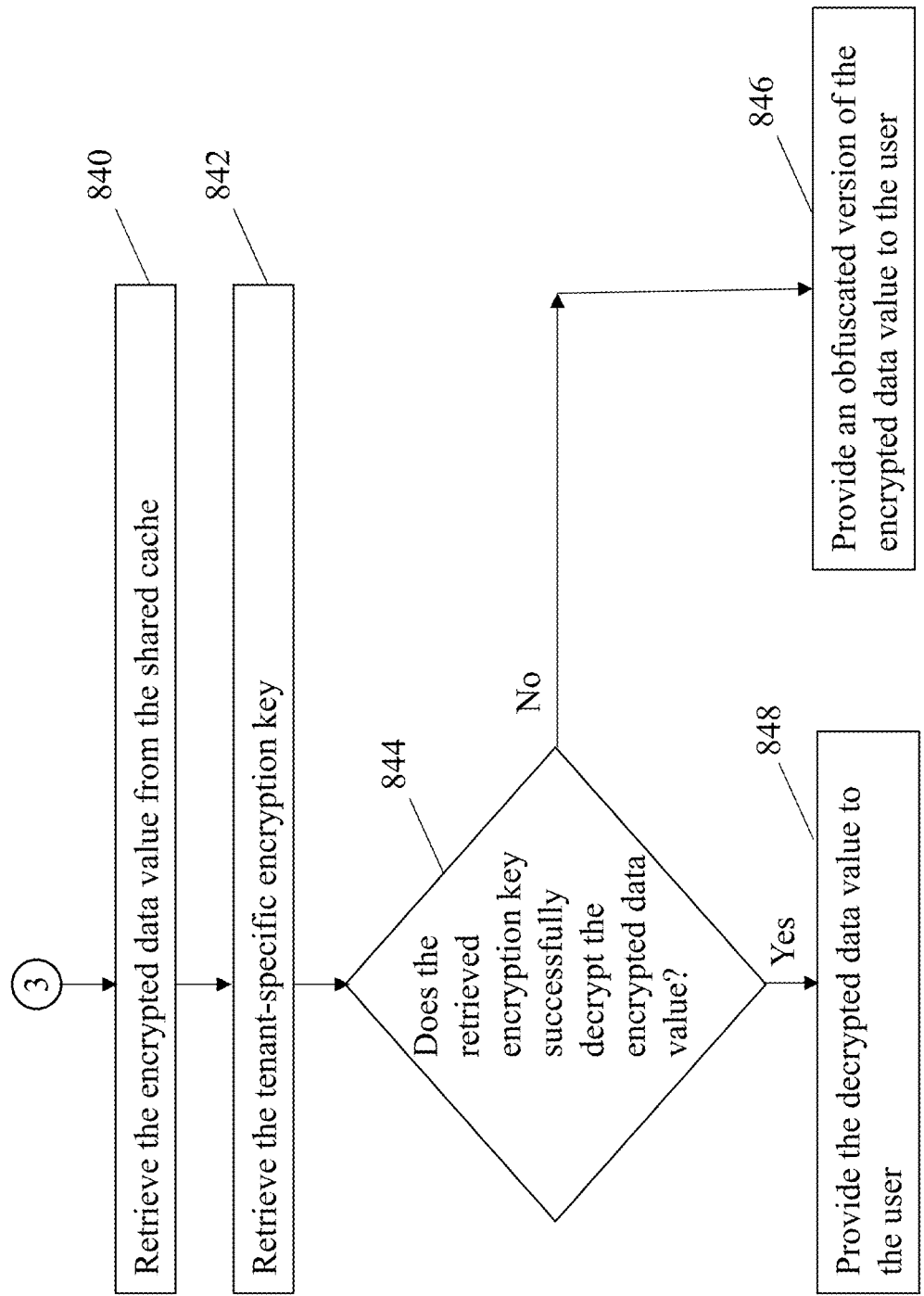

Referring to FIG. 8, and FIGS. 1 and 2, a flow chart is provided illustrating a process 800 for retrieving the encrypted data value 192 from the stored cache 136 through the value space protection scheme 232. In at least one embodiment, the first tenant will attempt 802 to attain access to, and retrieve, the first tenant's encrypted data value 192 on the shared cache 136 through the console portion 152 of the associated instance of the cloud-based application 150. In one embodiment, such data, e.g., and without limitation, encrypted data value 192, is stored on the shared cache 136 by the first tenant through the put process 700 with respect to FIG. 7. User 1 attempts 802 to retrieve the encrypted data value 192 stored in the shared cache 136 through the first tenant device 114 by initiating 804 a get action. The first tenant will generate 806 a request to access and retrieve the encrypted data value 192 on the shared cache 136 through the cloud-based application 150, i.e., a get request 184. The get request 184 includes the tenant-specific cache key, that in turn includes the credentials specific to the first tenant for data retrieval.

Upon receipt of the get request 184, and prior to retrieving the encrypted data value 192 in the shared cache 136, the first tenant-specific cache key 260 is generated 808 by the console portion 152 of the application 150. In at least one embodiment, and without limitation, and as described herein, the first tenant-specific cache key 260 has a specific format restricted to {User1-Tenant1-<key-name>}. The first tenant-specific cache key 260 is shown in phantom in FIG. 2 to indicate that it is created external to the cache proxy 200.

In at least some embodiments, the cloud-based application 150 uses the first tenant-specific cache key 260 to form a get request 270, where the get request 270 is substantially similar to the get request 194 shown in FIG. 1. The cloud-based application 150 delegates 810 the get request 270 to the cache proxy 200. Upon receipt of the get request 270 by the cache proxy 200, the get request 270 is executed through the cache key space protection scheme 212 and the value space protection scheme 232 by initializing 812 the cache proxy 200 through initializing the bootstrap configuration module 204 via the console portion 152 of the application 150 through a "hand-off" to the cache initializer module 202 in the cache proxy 200. The initialization 812 initializes both the cache key space protection scheme 212 and the value space protection scheme 232 concurrently. The bootstrap configuration that is generated as described herein, and stored in the bootstrap configuration module, is directed toward enforcement of the cache key space protection scheme 212 and the value space protection scheme 232.

The bootstrap configuration module 204 will trigger the shared cache protection start module 250 that will in turn trigger 814 the registered key scheme handler module 216 to attempt 816 to validate the pattern of the cache key 260. The registered key scheme handler module 216 executes the key pattern enforcement instructions from the key pattern enforcement instructions module 214 through the key space protection scheme 212. If the credentials associated with the first tenant are validated, i.e., the pattern of the cache key 260 and the first tenant-specific tenant identifier are validated, the validation is transmitted to the bootstrap configuration module 204 as the cache key pattern-based protection scheme validation 218. A permissive to access the encrypted data value 192 within the shared cache 136 is generated 818 and is transmitted with the cache key pattern-based protection scheme validation 218 to the bootstrap configuration module 204.

If the registered key scheme handler module 216 cannot validate the pattern of the cache key 260 to the tenant-specific pattern, or, the tenant identifier does not match the first tenant-specific tenant identifier, the credentials are not validated by the key space protection scheme 212, a denial is transmitted to the bootstrap configuration module 204 through the cache key pattern-based protection scheme denial 220, and retrieval of the encrypted data value 192 from the shared cache 136 is denied 820. Accordingly, the cache key space protection scheme 212 facilitates tenants' data separation on the shared cache 136 during attempted data retrieval from the shared cache 136 through enforcing a specific pattern of the tenant-specific cache key 260, including the correct tenant identifier therein, prior to employing the value space protection scheme 232. Therefore, in at least one embodiment, the cache key space protection scheme 212 and the value space protection scheme 232 are executed in tandem.

In at least some embodiments, in addition to exercising the key space protection scheme 212, the value space protection scheme 232 is executed to fulfill the get request 194/270. As described elsewhere herein, upon receipt of the get request 194/270, and prior to retrieving the encrypted data value 192 in the shared cache 136, the get process for retrieval of the encrypted data value 192 as executed through the value space protection scheme 232 is performed by initializing, by the console portion 152 of the application 150, the cache proxy 200 through the cache initializer module 202. The bootstrap configuration is directed toward enforcement of both the cache key space protection scheme 212 and the value space protection scheme 232 to retrieve and decrypt the encrypted data value 192. Accordingly, the cache key space protection scheme 212 will prevent improper or unauthorized data retrieval prior to use of the value space protection scheme 232 through enforcing a specific pattern of the tenant-specific cache key 260, including the correct tenant identifier therein, prior to employing the value space protection scheme 232. Therefore, in at least one embodiment, the cache key space protection scheme 212 and the value space protection scheme 232 are executed in tandem.

In at least some embodiments, in addition to exercising the key space protection scheme 212, the value space protection scheme 232 is executed to fulfill the get request 194/270. As described elsewhere herein, upon receipt of the cache key pattern-based protection scheme validation 218, indicative of the retrieval permissive, the bootstrap configuration module 204 again triggers the shared cache protection start module 250 that will in turn trigger 830 the registered value scheme handler module 240 to execute one or more of the tenant value injection instructions from the tenant value injection instructions module 234, the tenant value obfuscation instructions from the tenant value obfuscation instructions module 236 and the tenant value injection instructions from the tenant value injection instructions module 234.

The registered value scheme handler module 240 uses the tenant value injection instructions from the tenant value injection instructions module 234 to compare 832 the tenant identification from the tenant-specific cache key 260 with the tenant identification embedded with the encrypted data value 192 stored in the shared cache 136. The registered value scheme handler module 240 attempts to validate 834 the injected tenant identification. If the tenant identification with the encrypted data value 192 is validated, a permissive to retrieve the encrypted data value 192 within the shared cache 136 is generated 836 and is transmitted with the value-based protection scheme validation 244 to the bootstrap configuration module 204. If the registered value scheme handler module 240 cannot validate the injected tenant identification, or if not injected tenant identification is found, a denial is transmitted to the bootstrap configuration module 204 through the value-based protection scheme denial 246, and retrieval of the encrypted data value 192 from the shared cache 136 is denied 838.

Upon receipt of the permissive to retrieve the encrypted data value 192 within the shared cache 136, the registered value scheme handler module 240 retrieves 840 the encrypted data value 192 from the shared cache 136 as encrypted data value 196. The registered value scheme handler module 240 also retrieves 842 the tenant-specific encryption key for the associated tenant from the tenant encryption key store module 242 to attempt to decrypt 844 the encrypted data value 196. If the retrieved key is not the same key that initially encrypted the data value 196, the decryption will either fail or return a garbled, i.e., an obfuscated value will be provided 846 to the user. The obfuscated value is a result of the registered value scheme handler module 240 receiving the tenant value obfuscation instructions from the tenant value obfuscation instructions module 236. If the retrieved key properly decrypts the encrypted data value 196, the decrypted data value 198 is provided 848 to the requesting user. Accordingly, the cache value space protection scheme 232 facilitates tenants' data separation on the shared cache 136 during data retrieval from the shared cache 136 through a combination of: 1) tenant value injection features to validate the tenant identifier injected as an attribute to the data value field for the data value that is to be retrieved from the shared cache; and 2) a tenant-specific encryption key that is used to decrypt the encrypted data value that is to be retrieved from the shared cache 136.

Figure 9:
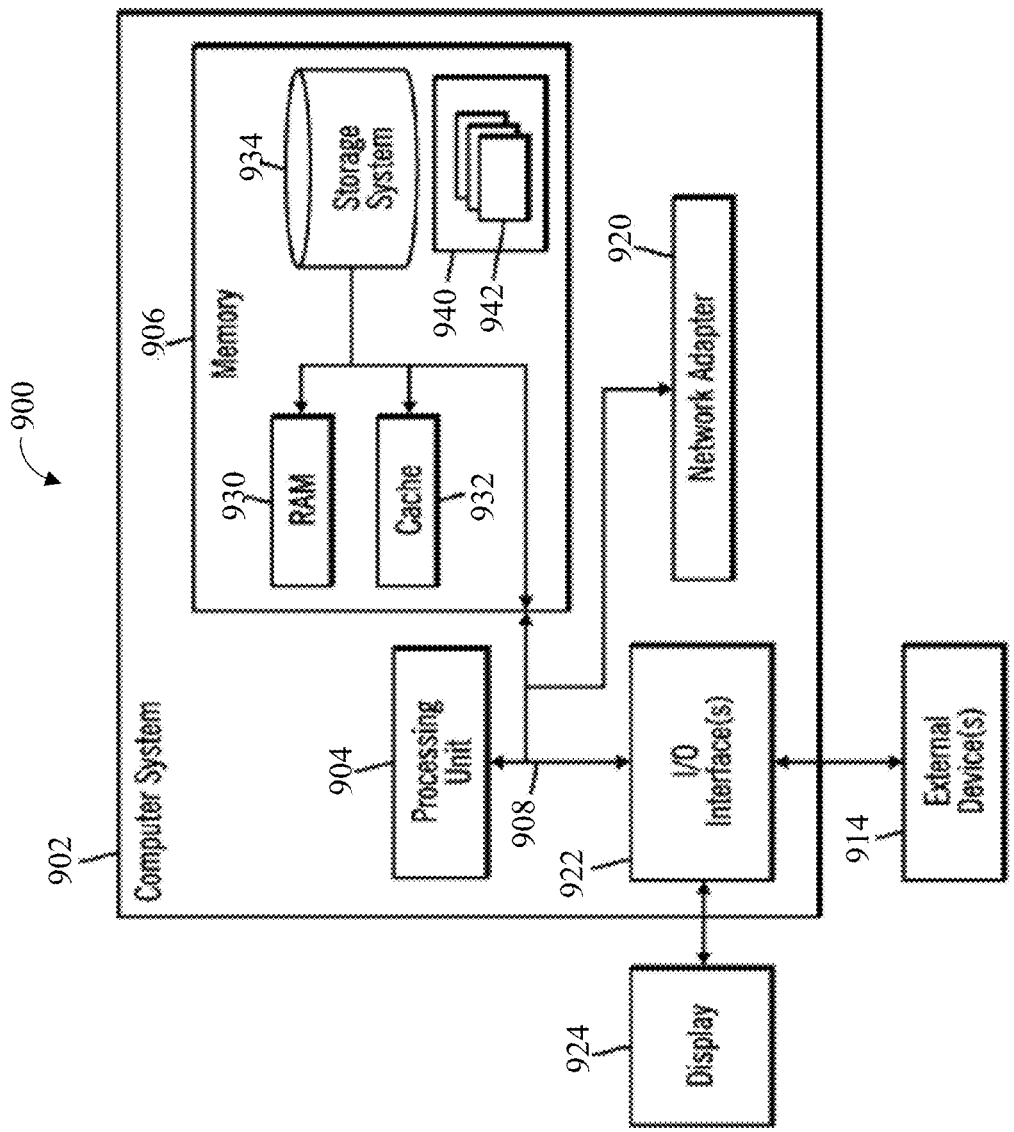
FIG. 9 is a block diagram illustrating a computer system/server of a cloud-based support system, to implement the processes described above with respect to FIGS. 1-8, in accordance with some embodiments of the present disclosure.

Aspects of the cache proxy 200 may be embodied in a computer system/server in a single location, or in at least one embodiment, may be configured in a cloud-based system sharing computing resources. With reference to FIG. 9, a block diagram is provided illustrating an example of a computer system 900 including a computer/server 902, hereinafter referred to as a host 902 in communication with a cloud based support system, to implement the system, tools, and processes described above with respect to FIGS. 1-8. Host 902 is operational with numerous other general purpose or special purpose computer system environments or configurations. Examples of well-known computer systems, environments, and/or configurations that may be suitable for use with host 902 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host 902 may be described in the general context of computer system-executable instructions, such as program modules, being executed by a computer system. Generally, program modules may include routines, programs, objects, components, logic, data structures, and so on that perform particular tasks or implement particular abstract data types. Host 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, host 902 is shown in the form of a general-purpose computing device. The components of host 902 may include, but are not limited to, one or more processors or processing devices or units 904, e.g. hardware processors, a system memory 906, and a bus 908 that couples various system components including system memory 906 to processing device 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host 902 typically includes a variety of computer system readable media. Such media may be any available media that is accessible by host 902 and it includes both volatile and non-volatile media, removable and non-removable media.

Memory 906 can include computer system readable media in the form of volatile memory, such as random access memory (RAM) 930 and/or cache memory 932, where, in some embodiments, such cache memory 932 includes shared cache 136, shared cache 336, or shared cache 436 as shown in FIGS. 1, 3, and 4, respectively. By way of example only, a storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces.

Program/utility 940, having a set (at least one) of program modules 942, may be stored in memory 906 by way of example, and not limitation, as well as an operating system, one or more application programs, other program modules, and program data. Each of the operating systems, one or more application programs, other program modules, and program data or some combination thereof, may include an implementation of a networking environment. Program modules 942 generally carry out the functions and/or methodologies of embodiments to dynamically capture environmental configuration changes related to applications such that co-processing a plurality of dependent systems with a finite number of processing threads is enabled. For example, the set of program modules 942 may include the cache proxy 200, including the plurality of modules embedded therein, as described in FIGS. 1-8.

Host 902 may also communicate with one or more external devices 914, such as a keyboard, a pointing device, etc.; a display 924; one or more devices that enable a user to interact with host 902; and/or any devices (e.g., network card, modem, etc.) that enable host 902 to communicate with one or more other computing devices. Such communication can occur via Input/Output (I/O) interface(s) 922. Still yet, host 902 can communicate with one or more networks such as a local area network (LAN), a general wide area network (WAN), and/or a public network (e.g., the Internet) via network adapter 920. As depicted, network adapter 920 communicates with the other components of host 902 via bus 908. In at least one embodiment, a plurality of nodes of a distributed file system (not shown) is in communication with the host 902 via the I/O interface 922 or via the network adapter 920. It should be understood that although not shown, other hardware and/or software components could be used in conjunction with host 902. Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory 906, including RAM 930, cache memory 932, and storage system 934, such as a removable storage drive and a hard disk installed in a hard disk drive.

Computer programs (also called computer control logic) are stored in memory 906. Computer programs may also be received via a communication interface, such as network adapter 920. Such computer programs, when run, enable the computer system to perform the features of the present embodiments as discussed herein. In particular, the computer programs, when run, enable the processing device 904 to perform the features of the computer system. As such, computer programs may represent controllers of the computer system. Accordingly, the functionality for the cache proxy 200, including the plurality of modules embedded therein, as described in FIGS. 1-8, is embodied as computer program code stored in memory 906 (in some embodiments as program modules 942), where the computer program code includes the instructions to be executed by the processing device 904 to provide the functionality of the cache proxy 200, including the plurality of modules embedded therein, as described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments. Accordingly, the functionality for the for the cache proxy 200, including the plurality of modules embedded therein, as described in FIGS. 1-8, may be embodied as computer readable program instructions to be executed by one or more hardware devices other than, or in addition to, the processing device 904 to implement the functionality of the for the cache proxy 200, including the plurality of modules embedded therein, as described herein.

In at least one embodiment, host 902 is a node of a cloud computing environment. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 10:
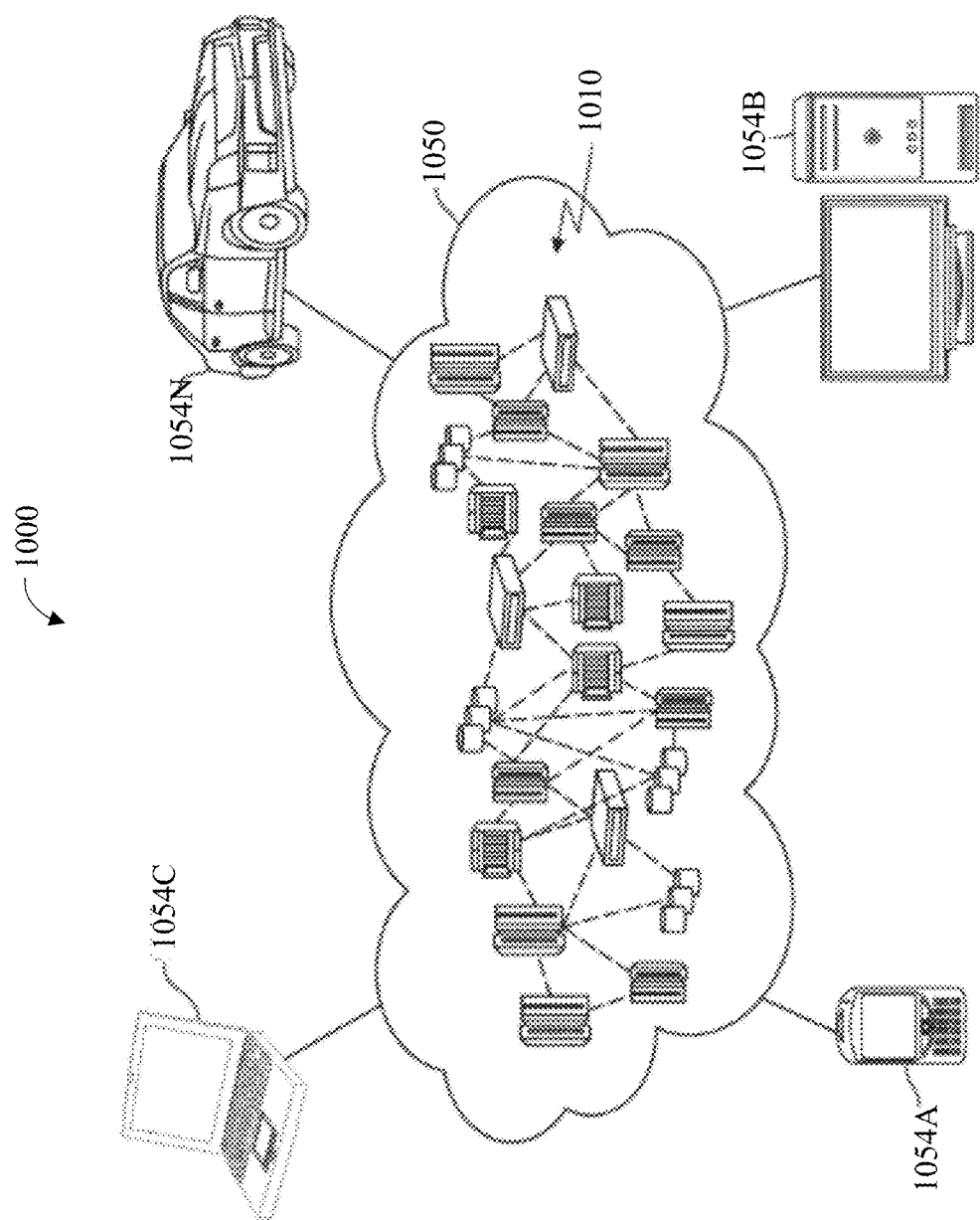
FIG. 10 is a schematic diagram illustrating a cloud computer environment, in accordance with some embodiments of the present disclosure.

Referring now to FIG. 10, a schematic diagram is provided illustrating an example cloud computing network 1000. As shown, cloud computing network 1000 includes a cloud computing environment 1050 having one or more cloud computing nodes 1010 with which local computing devices used by cloud consumers may communicate. Examples of these local computing devices include, but are not limited to, personal digital assistant (PDA) or cellular telephone 1054A, desktop computer 1054B, laptop computer 1054C, and/or automobile computer system 1054N. Individual nodes within nodes 1010 may further communicate with one another. They may be grouped (not shown) physically or virtually, in one or more networks, such as Private, Community, Public, or Hybrid clouds as described hereinabove, or a combination thereof. This allows the cloud computing network 1000 to offer infrastructure, platforms and/or software as services for which a cloud consumer does not need to maintain resources on a local computing device. It is understood that the types of computing devices 1054A-N shown in FIG. 10 are intended to be illustrative only and that the cloud computing environment 1050 can communicate with any type of computerized device over any type of network and/or network addressable connection (e.g., using a web browser).

Figure 11:
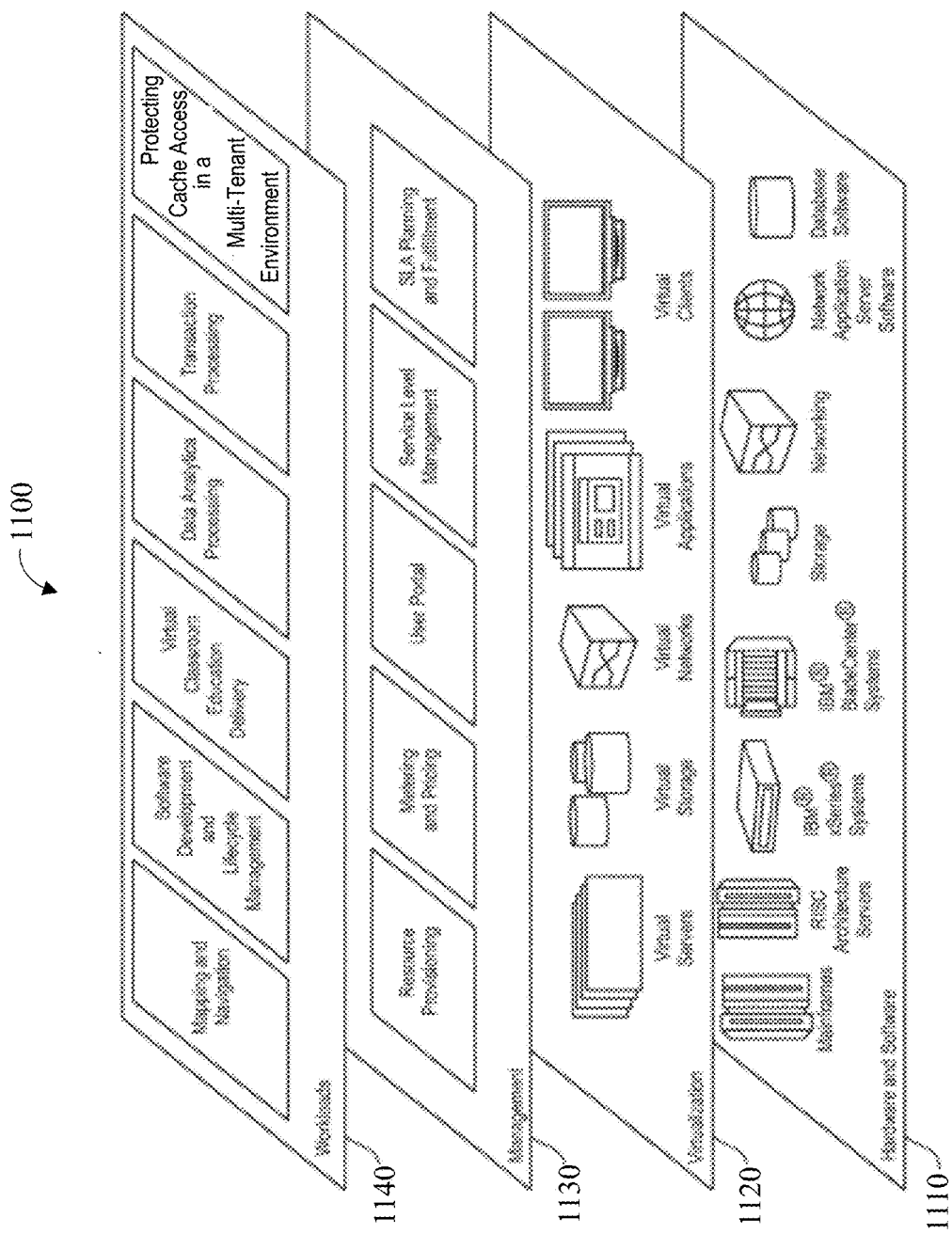
FIG. 11 is a block diagram illustrating a set of functional abstraction model layers provided by the cloud computing environment, in accordance with some embodiments of the present disclosure.

Referring now to FIG. 11, a set of functional abstraction layers 1100 provided by the cloud computing network of FIG. 10 is shown. It should be understood in advance that the components, layers, and functions shown in FIG. 11 are intended to be illustrative only, and the embodiments are not limited thereto. As depicted, the following layers and corresponding functions are provided: hardware and software layer 1110, virtualization layer 1120, management layer 1130, and workload layer 1140.

The hardware and software layer 1110 include hardware and software components. Examples of hardware components include mainframes; RISC (Reduced Instruction Set Computer) architecture-based servers; servers; blade servers; storage devices; networks and networking components. Examples of software components include network application server software, and database software.

Virtualization layer 1120 provides an abstraction layer from which the following examples of virtual entities may be provided: virtual servers; virtual storage; virtual networks, including virtual private networks; virtual applications and operating systems; and virtual clients.

In one example, management layer 1130 may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer 1140 provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and protecting cache access in a multi-tenant environment, and, more specifically, for allowing access to specified data, encrypted or unencrypted, in a shared cache to authorized tenants, while denying access to the data for unauthorized tenants.

It will be appreciated that there is disclosed herein a system, method, apparatus, and computer program product for evaluating natural language input, detecting an interrogatory in a corresponding communication, and resolving the detected interrogatory with an answer and/or supporting content.

While particular embodiments of the present disclosure have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product are operative to improve the functionality and operation of a computer-based system or platform.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Accordingly, the scope of protection of the embodiments is limited only by the following claims and their equivalents.

What is claimed is:

1. A computer system comprising:
a server comprising one or more shared cache, the server configured to run one or more applications thereon, wherein the server is communicatively coupled to a plurality of tenant devices comprising at least a first tenant device and a second tenant device; and
a processing device configured to implement a cache proxy, the cache proxy coupled to at least the first tenant device and the second tenant device and the one or more shared cache, wherein the first tenant device and the second tenant device have access to the shared cache through the cache proxy, wherein the cache proxy is resident within one or more of:
a client-side portion of the one or more applications;
a server-side portion of the one or more applications; and
the one or more shared cache;
wherein, the cache proxy is configured to:
receive, from a first instance of the one or more applications on behalf of the first tenant device, a request for retrieval and storage of data stored on the shared cache, wherein the request includes a cache key that includes credentials specific to the first tenant device to permit retrieval of the data from the one or more shared cache, wherein the credentials comprise a plurality of sequences of values arranged in a predetermined pattern, each sequence of values of the plurality of sequences of values comprises a specific identifier;
determine the credentials are valid through the validation of the predetermined pattern of the plurality of sequences of values of the cache key, wherein the validation comprises validation of each sequence of values of the plurality of sequences of values comprising two or more of:
a tenant identifier of the cache key;
a user identification of the cache key; and
a cache key name;
retrieve and store the data in the one or more shared cache, through execution of, by the cache proxy, a cache key space protection scheme, thereby creating retrieved and stored data, comprising:
embedding of the tenant identifier within the cache key, wherein the tenant identifier at least partially defines the credentials;
initialization of the cache proxy with a bootstrap cache configuration directed toward at least the cache key space protection scheme;
executing of, by the cache proxy, tenant identifier injection instructions;
triggering, by the cache proxy, the registered key scheme handler to validate the pattern of the cache key;
executing, by the cache proxy, key pattern enforcement instructions; and
one of:
provide, to the first tenant device, the retrieved data; and
provide, to the one or more shared cache, the stored data.

2. A computer program product for protecting cache access in a multi-tenant environment, the computer program product comprising:
one or more computer readable storage media; and
program instructions collectively stored on the one or more computer-readable storage media, the program instructions comprising:
program instructions to execute, by a cache proxy, a cache key space protection scheme to store and retrieve data on the shared cache, comprising:
program instructions to initialize the cache proxy with a bootstrap cache configuration directed toward at least the cache key space protection scheme;
program instructions to provide, to the cache proxy, from a first instance of an application on behalf of a first tenant device, a request for retrieval and storage of data stored on a shared cache, wherein the request includes a cache key, wherein the first tenant device and a second tenant device have access to the shared cache through the cache proxy;
program instructions to receive, at the cache proxy, the cache key, wherein the cache key includes credentials specific to the first tenant to permit retrieval and storage of the data in the shared cache, wherein the credentials comprise a plurality of sequences of values arranged in a predetermined pattern, each sequence of values of the plurality of sequences of values includes a specific identifier comprising a tenant identifier;
program instructions to trigger, by the cache proxy, a registered key scheme handler to validate the pattern of the cache key;
program instructions to execute, by the cache proxy, key pattern enforcement instructions;
program instructions to determine, by the cache proxy, the credentials are valid, including program instructions to validate, by the cache proxy, the predetermined pattern of the plurality of sequences of values of the cache key at least partially through the initialization of the cache proxy with the bootstrap configuration directed toward at least the cache key space protection scheme, wherein the validation comprises validation of each sequence of values of the plurality of sequences of values comprising two or more of:
a tenant identifier of the cache key;
a user identification of the cache key; and
a cache key name;
program instructions to retrieve and store, by the cache proxy, the data, thereby creating retrieved and stored data;
program instructions to allow, by the cache proxy, the stored data to be stored in the shared cache and retrieval of the data stored in the cache proxy, wherein the stored data is stored on the shared cache through a value space protection scheme comprising:
program instructions to initialize the cache proxy with the bootstrap cache configuration directed toward at least the value space protection scheme;
program instructions to trigger, by the cache proxy, a registered value scheme handler to inject the tenant identifier into a tenant cache value;
program instructions to execute, by the cache proxy, tenant identifier injection instructions;
program instructions to inject the tenant identifier into the tenant cache value;

program instructions to create, by the cache proxy, a tenant-specific encryption key;
program instructions to encrypt, by the cache proxy, the tenant cache value with the tenant-specific encryption key, thereby creating an encrypted tenant cache value;
program instructions to place, by the cache proxy, the encrypted tenant cache value into the shared cache;
program instructions to trigger, by the cache proxy, the registered value scheme handler to validate the tenant identifier;
program instructions to retrieve, by the cache proxy, the tenant-specific encryption key;
program instructions to decrypt, by the cache proxy, the encrypted tenant cache value, thereby creating a decrypted tenant cache value; and
program instructions to validate, by the cache proxy, the tenant identifier; and
program instructions to provide, by the cache proxy, to the first tenant device, the retrieved data.

3. A computer-implemented method comprising:
receiving, by the cache proxy, from a first instance of an application on behalf of a first tenant device, a request for retrieval and storage of data stored on a shared cache, wherein the request includes a cache key, the cache key includes credentials specific to the first tenant device to permit retrieving the data in the shared cache, the first tenant device and a second tenant device have access to the shared cache through the cache proxy, wherein the credentials comprise a plurality of sequences of values arranged in a predetermined pattern, each sequence of values of the plurality of sequences of values includes a specific identifier;
determining, by the cache proxy, the credentials are valid through validating the predetermined pattern of the plurality of sequences of values of the cache key, wherein the validation comprises validation of each sequence of values of the plurality of sequences of values comprising two or more of:
a tenant identifier of the cache key;
a user identification of the cache key; and
a cache key name;
retrieving and storing the data in the shared cache, through executing, through the cache proxy, a value space protection scheme, thereby creating retrieved and stored data, comprising;
embedding the tenant identifier within the cache key, wherein the tenant identifier at least partially defines the credentials;
initializing the cache proxy with a bootstrap cache configuration directed toward at least the value space protection scheme;
triggering, by the cache proxy, a registered value scheme handler to inject the tenant identifier into a tenant cache value;
executing, by the cache proxy, tenant identifier injection instructions, thereby injecting the tenant identifier into the tenant cache value;
creating, by the cache proxy, a tenant-specific encryption key;
encrypting, by the cache proxy, the tenant cache value with the tenant-specific encryption key, thereby creating an encrypted tenant cache value;
placing, by the cache proxy, the encrypted tenant cache value into the shared cache;
triggering, by the cache proxy, the registered value scheme handler to validate the tenant identifier;
retrieving, by the cache proxy, the tenant-specific encryption key;
decrypting, by the cache proxy, the encrypted tenant cache value, thereby creating a decrypted tenant cache value;
validating, by the cache proxy, the tenant identifier; and
one of:
providing, by the cache proxy, to the first tenant device, the retrieved data, and
providing, to the shared cache, the stored data.

* * * * *